(12) United States Patent
Ishihara

(10) Patent No.: US 7,590,891 B2
(45) Date of Patent: Sep. 15, 2009

(54) DEBUGGING CIRCUIT AND A METHOD OF CONTROLLING THE DEBUGGING CIRCUIT

(75) Inventor: Yuzo Ishihara, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 425 days.

(21) Appl. No.: 11/109,771

(22) Filed: Apr. 20, 2005

(65) Prior Publication Data

US 2005/0268168 A1 Dec. 1, 2005

(30) Foreign Application Priority Data

Apr. 27, 2004 (JP) ............................. 2004-131063

(51) Int. Cl.
*G06F 11/00* (2006.01)
(52) U.S. Cl. ....................................... 714/30; 714/724
(58) Field of Classification Search .................. 714/30, 714/34, 724
See application file for complete search history.

(56) References Cited

U.S. PATENT DOCUMENTS

| | | | | |
|---|---|---|---|---|
| 4,789,924 A * | 12/1988 | Fukuta | ........................ | 703/23 |
| 5,210,864 A * | 5/1993 | Yoshida | ........................ | 714/37 |
| 5,331,571 A * | 7/1994 | Aronoff et al. | .................. | 716/4 |
| 5,475,852 A * | 12/1995 | Yoshida et al. | ................ | 714/34 |
| 5,488,728 A * | 1/1996 | Dreyer | ........................ | 710/200 |
| 5,530,804 A * | 6/1996 | Edgington et al. | ............ | 714/30 |
| 5,581,698 A * | 12/1996 | Miwa et al. | .................... | 714/42 |
| 5,617,576 A * | 4/1997 | Solari et al. | ................... | 712/40 |
| 5,838,692 A * | 11/1998 | Tobin | ........................ | 714/724 |
| 5,838,897 A * | 11/1998 | Bluhm et al. | ................. | 714/30 |
| 5,848,268 A * | 12/1998 | Matsuo | ....................... | 712/233 |
| 5,862,148 A * | 1/1999 | Typaldos et al. | ............. | 714/724 |
| 5,991,910 A * | 11/1999 | Hull et al. | ................... | 714/733 |
| 6,003,142 A * | 12/1999 | Mori | ........................... | 714/30 |
| 6,035,422 A * | 3/2000 | Hohl et al. | ................... | 714/35 |
| 6,065,106 A * | 5/2000 | Deao et al. | ................... | 712/24 |
| 6,134,652 A * | 10/2000 | Warren | ....................... | 712/227 |
| 6,145,123 A * | 11/2000 | Torrey et al. | ................ | 717/128 |
| 6,154,856 A * | 11/2000 | Madduri et al. | .............. | 714/27 |
| 6,311,292 B1 * | 10/2001 | Choquette et al. | ............ | 714/30 |
| 6,343,358 B1 * | 1/2002 | Jaggar et al. | ................ | 712/227 |
| 6,349,392 B1 * | 2/2002 | Swoboda et al. | .............. | 714/30 |

(Continued)

FOREIGN PATENT DOCUMENTS

JP 2000276358 10/2000

*Primary Examiner*—Robert Beausoliel
*Assistant Examiner*—Joshua P Lottich
(74) *Attorney, Agent, or Firm*—Volentine & Whitt, P.L.L.C.

(57) ABSTRACT

In a debugging circuit and a controlling method of the debugging circuit, a mode judgment signal is generated which indicates that a central processing unit (CPU) is preparing to debug a predetermined program. Responsive to the mode judgment signal, a monitoring signal is generated indicative of an attempt by the CPU to execute the predetermined program during the debugging preparation. Furthermore, a transfer of an instruction code corresponding to the predetermined program is controlled so that the CPU is prevented from executing the predetermined program during the debugging preparation, responsive to the monitoring signal. Alternatively, in the debugging circuit and the method, instead of controlling the transfer of the instruction code responsive to the monitoring signal, another instruction code may be transferred to the CPU, responsive to the mode judgment signal. The another instruction code prevents the CPU from executing the predetermined program during the debugging preparation.

17 Claims, 11 Drawing Sheets

U.S. PATENT DOCUMENTS

| | | | |
|---|---|---|---|
| 6,367,032 B1 * | 4/2002 | Kasahara | 714/25 |
| 6,424,926 B1 * | 7/2002 | Mak | 702/117 |
| 6,473,727 B1 * | 10/2002 | Kirsch et al. | 703/28 |
| 6,564,339 B1 * | 5/2003 | Swoboda et al. | 714/30 |
| 6,591,378 B1 * | 7/2003 | Arends et al. | 714/38 |
| 6,643,809 B2 * | 11/2003 | Tsuboi et al. | 714/724 |
| 6,687,857 B1 * | 2/2004 | Iwata et al. | 714/38 |
| 6,691,266 B1 * | 2/2004 | Winegarden et al. | 714/724 |
| 6,708,270 B1 * | 3/2004 | Mayer | 713/1 |
| 6,725,306 B2 * | 4/2004 | Stuber et al. | 710/107 |
| 6,728,906 B1 * | 4/2004 | Case et al. | 714/45 |
| 6,762,617 B2 * | 7/2004 | Iwase et al. | 326/11 |
| 6,782,336 B2 * | 8/2004 | Shah | 702/118 |
| 6,823,224 B2 * | 11/2004 | Wood et al. | 700/87 |
| 6,918,058 B2 * | 7/2005 | Miura et al. | 714/30 |
| 6,922,794 B2 * | 7/2005 | Tagawa et al. | 714/28 |
| 6,954,878 B2 * | 10/2005 | Kudo | 714/30 |
| 6,985,980 B1 * | 1/2006 | Allegrucci | 710/107 |
| 7,003,763 B2 * | 2/2006 | Sudo et al. | 717/128 |
| 7,055,006 B1 * | 5/2006 | Kelsey et al. | 711/139 |
| 7,096,385 B1 * | 8/2006 | Fant et al. | 714/30 |
| 7,107,489 B2 * | 9/2006 | Gergen et al. | 714/30 |
| 7,114,101 B2 * | 9/2006 | Kudo et al. | 714/30 |
| 7,149,926 B2 * | 12/2006 | Ahmad et al. | 714/30 |
| 7,149,927 B2 * | 12/2006 | Stancil | 714/31 |
| 7,210,064 B2 * | 4/2007 | Mayer | 714/30 |
| 7,219,265 B2 * | 5/2007 | Yee | 714/30 |
| 7,231,551 B1 * | 6/2007 | Treue et al. | 714/30 |
| 7,260,745 B1 * | 8/2007 | Edwards et al. | 714/37 |
| 7,310,749 B2 * | 12/2007 | Swoboda et al. | 714/45 |
| 7,360,117 B1 * | 4/2008 | Boike et al. | 714/34 |
| 7,360,129 B2 * | 4/2008 | Tang | 714/718 |
| 7,509,533 B1 * | 3/2009 | Govindarajalu | 714/30 |
| 2001/0010083 A1 * | 7/2001 | Satoh | 714/30 |
| 2003/0060995 A1 * | 3/2003 | Shah | 702/118 |
| 2003/0163613 A1 * | 8/2003 | Stuber et al. | 710/15 |
| 2003/0191624 A1 * | 10/2003 | Morigaki et al. | 703/28 |
| 2007/0288922 A1 * | 12/2007 | Sueyoshi et al. | 718/100 |

* cited by examiner

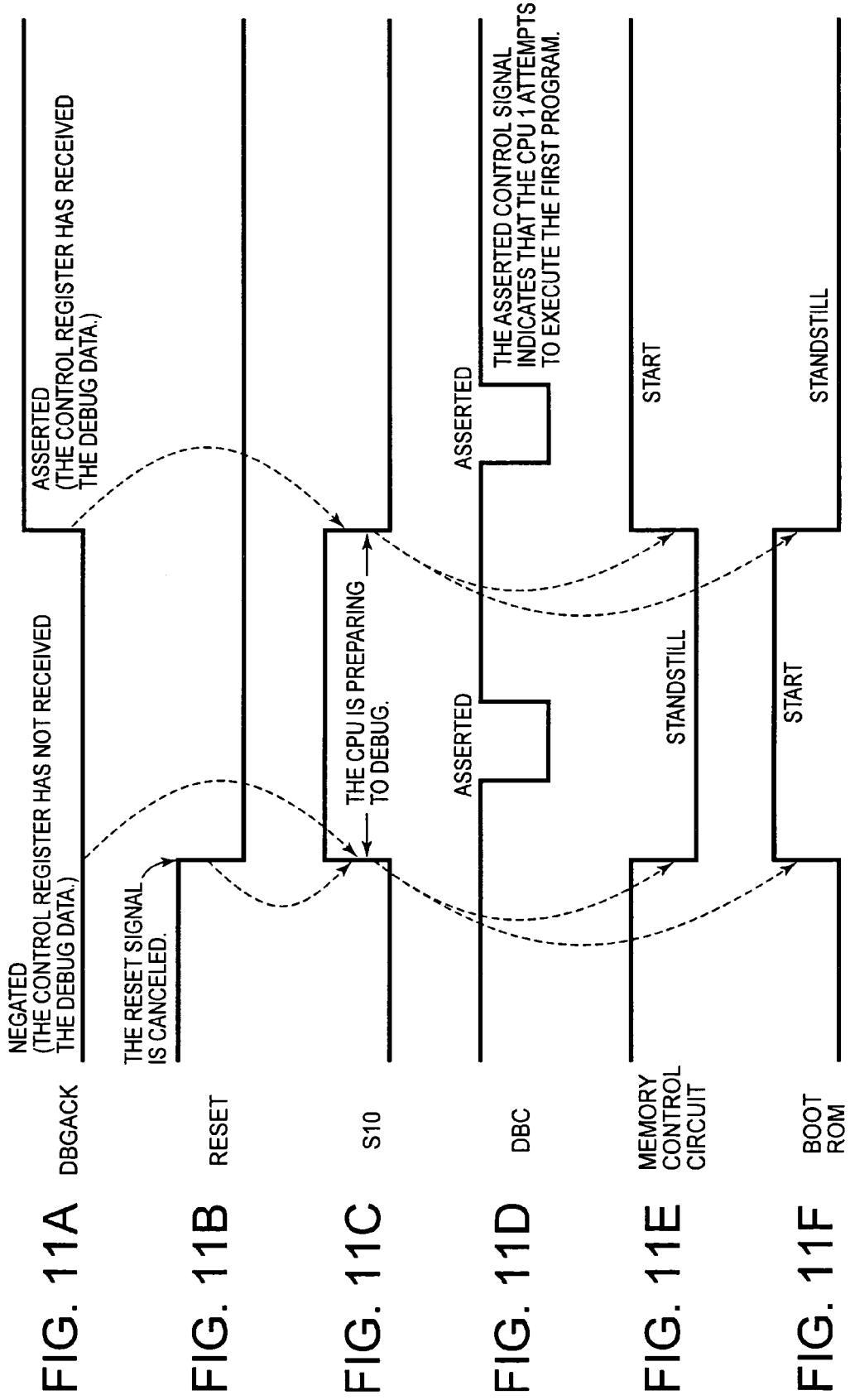

DEBUGGING CIRCUIT AND A METHOD OF CONTROLLING THE DEBUGGING CIRCUIT

BACKGROUND OF THE INVENTION

1. Field of the Invention

The present invention relates to a debugging circuit and a method of controlling the debugging circuit, in particular, to a debugging circuit which controls the central processing unit during a preparation for debugging a predetermined program to be executed by the central processing unit and a method of controlling the central processing unit of the debugging circuit during the debugging preparation. This is a counterpart of and claims priority to Japanese Patent Application No. 2004-131063 filed on Apr. 27, 2004, which is herein incorporated by reference.

2. Description of the Related Art

In a central processing system incorporated in an electronics device, a central processing unit (hereinafter referred to as a "CPU") executes a predetermined program and then controls a peripheral circuit such as a photographic image output circuit in the electronics device, as described in a Patent Document 1 (Japanese Patent Publication Laid-open No. 2000-276358).

FIG. 1 is a circuit block diagram for describing a debugging circuit in the central processing system of the related art. The debugging circuit in the central processing system has a CPU 1, an input-output circuit 2, a memory control circuit 3, a Read Only Memory 4 (ROM 4), a Random Access Memory 5 (RAM 5), a data bus 6, a memory bus 7, a reset signal input terminal 8, test access ports 100 which correspond to an interface of the Joint Test Action Group (hereinafter referred to as "JTAG interface"). The CPU 1 of the debugging circuit controls a peripheral circuit which is coupled to the input-output circuit 2. The peripheral circuit may be an external memory circuit or a photographic image output circuit.

The CPU 1 is reset when a reset signal HRESET is asserted. The reset of the CPU 1 is canceled when the reset signal HRESET is negated, and then the CPU 1 begins to operate in a normal operational mode. The CPU 1 reads out instruction codes which are stored in the ROM 4 and then executes a predetermined program in accordance with the instruction codes, just after the reset of the CPU 1 is canceled. Thereafter, the CPU 1 executes the predetermined program in accordance with the instruction codes without interruption or executes another program in accordance with instruction codes which are transferred from the external memory circuit in accordance with the instruction codes into the RAM 5.

In general, the CPU in the central processing system has a single step mode function of the program, a breaking function of the program, a reference/modification function to a control register in the CPU and a debugging function such as a reference/modification function to a memory circuit, in order to execute the debugging of the program with ease during a development of the program which is stored, for example, in the ROM 4 or the external memory circuit. Recently, in order to control the debugging function, the JTAG interface that can reduce the number of input/output signal lines is often used as shown in FIG. 1.

In order to realize the above-described debugging function, the CPU 1 as shown in FIG. 1, which has the JTAG interface, operates in the normal operational mode and a debugging operation mode. In the normal operational mode, the CPU 1 executes the program normally. In the debugging operation mode, the CPU 1 operates in accordance with debug data which are input to the CPU 1 through the JTAG interface in order to realize the debugging function. The switching between the normal operational mode and the debugging operation mode is controlled by command signals which are input to the CPU 1 through the JTAG interface.

FIG. 2 is a schematic circuit diagram for describing the JTAG interface. In the interface corresponding to the JTAG as shown in FIG. 2, the command signals are input to a control register 106 of the CPU 1 through the JTAG interface in accordance with a serial data transport protocol before the CPU 1 operates in the debugging operation mode. After the control register 106 receives the command signals, the CPU 1 asserts a debug acknowledge signal DBGACK and then suspends the normal operation mode to operate in the debugging operation mode. In addition, the debug acknowledge signal DBGACK is not particularly used in the debugging circuit of the central processing system shown in FIG. 1.

Before the CPU 1 operates in the debugging operation mode following the cancellation of the reset of the CPU 1, the CPU 1 prepares to debug the program so that the operation mode of the CPU 1 is switched from the normal operational mode to the debugging operation mode by the control from the JTAG interface. After the completion of the debugging preparation, the execution of the program stored in the ROM 4 or the external memory circuit is suspended. On the other hand, however, the debugging function of the CPU 1 is controlled through the JTAG interface in accordance with the serial data transport protocol in the debugging circuit of the central processing system. Therefore, it takes a long time to complete the debugging preparation from inputting the command signals to the test access ports 100 till inputting the command signals to the control register 106. As a result, it takes a long time from the cancellation of the reset of the CPU 1 till the completion of the debugging preparation. On such an occasion as this, the program stored in the ROM 4 or the external memory circuit may be executed by the CPU 1 during the debugging preparation. When the program is executed between the cancellation of the reset of the CPU 1 and the completion of the debugging preparation, the debugging operation of the CPU 1 may not be properly executed just after the cancellation of the reset of the CPU 1. Also, when the program is executed between the cancellation of the reset of the CPU 1 and the completion of the debugging preparation, the peripheral circuit controlled by the CPU 1 in the central processing system may operate unnecessarily. Furthermore, the debugging operation of the CPU 1 may be executed using a random-access memory such as a Static Random Access Memory (hereinafter referred to as "SRAM") instead of the ROM 4. On such an occasion as this, at the beginning of the debugging operation, the program to be debugged is transported to the control register 106 of the CPU 1 through the JTAG interface, the program goes on to be transported from the control register 106 to the SRAM to be written in the SRAM, and then the CPU 1 reads out the program written in the SRAM to debug the program. In this case, the contents in the SRAM are indeterminate just after the cancellation of the reset of the CPU 1. Therefore, when the contents in the SRAM are executed between the cancellation of the reset of the CPU 1 and the completion of the debugging preparation, the CPU 1 may run out of control and then the peripheral circuit may execute an unpredictable operation.

SUMMARY OF THE INVENTION

An object of the present invention is to prevent the central processing unit from executing the predetermined program from the cancellation of the reset of the CPU till the completion of the debugging preparation and then to properly execute the debugging operation by the CPU after the cancellation of the reset of the CPU.

According to an aspect of the present invention, for achieving the above-mentioned object, there is provided a method of controlling a debugging circuit which debugs a predetermined program using debug data input to a control register of a central processing unit. In the method, a mode judgment signal is generated when a reset of the central processing unit has been canceled and the control register has not received the debug data. The mode judgment signal indicates that the central processing unit is preparing to debug the predetermined program. In the method, a control signal is generated from the control register during execution of the predetermined program. Then, a monitoring signal is generated responsive to the control signal and the mode judgment signal. The monitoring signal is indicative of an attempt by the central processing unit to execute the predetermined program during the debugging preparation. Furthermore, in the method, a data bus, along which an instruction code corresponding to the predetermined program is transferred, is controlled so that the central processing unit is prevented from executing the predetermined program during the debugging preparation, responsive to the monitoring signal.

According to another aspect of the present invention, for achieving the above-mentioned object, there is provided a method of controlling a debugging circuit which debugs a first program using debug data input to a control register of a central processing unit. The first program is executed by the central processing unit during a normal operational mode. In the method, a mode judgment signal is generated when a reset of the central processing unit has been canceled and the control register has not received the debug data. The mode judgment signal is indicative that the central processing unit is preparing to debug the first program. Then, a data bus is controlled so that the central processing unit is prevented from accessing a first instruction code corresponding to the first program during the debugging preparation, responsive to the mode judgment signal. Furthermore, in the method, a second instruction code corresponding to a second program different than the first program is transferred to the central processing unit through the data bus during the debugging preparation, responsive to the mode judgment signal.

The above and further aspects and novel features of the invention will more fully appear from the following detailed description, appended claims and the accompanying drawings.

BRIEF DESCRIPTION OF THE DRAWINGS

FIGS. 11A through 11F are signal waveform diagrams for describing the operation of the debugging circuit in FIG. 10.

DETAILED DESCRIPTION OF THE PREFERRED EMBODIMENTS

Embodiments of the present invention will be described hereinafter with references to the accompanying drawings. The drawings used for this description illustrate major characteristic parts of embodiments in order that the present invention will be easily understood. However, the invention is not limited by these drawings.

Figure 1:
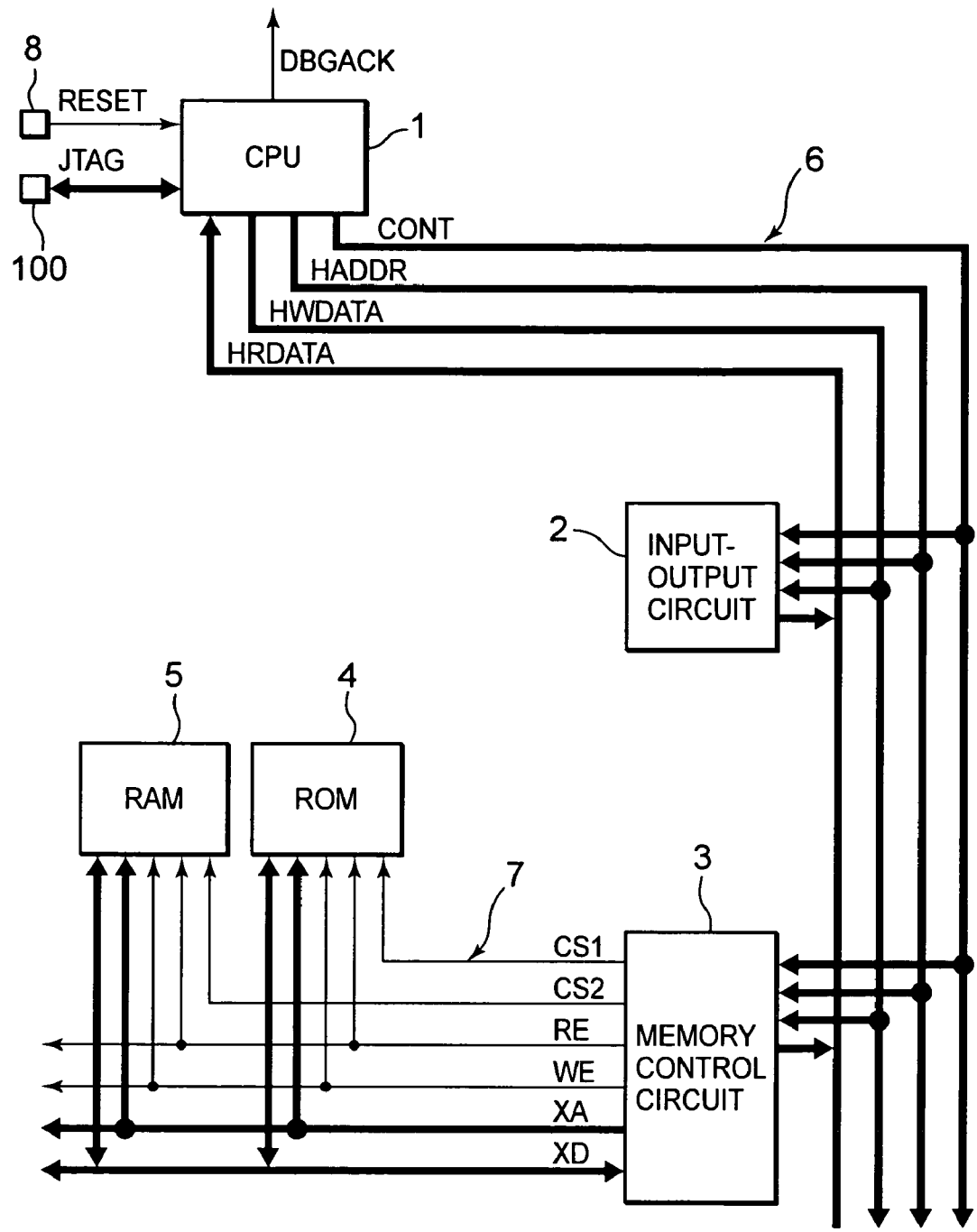
FIG. 1 is a circuit block diagram for describing a semiconductor integrated circuit in the central processing system of the related art.
Figure 2:
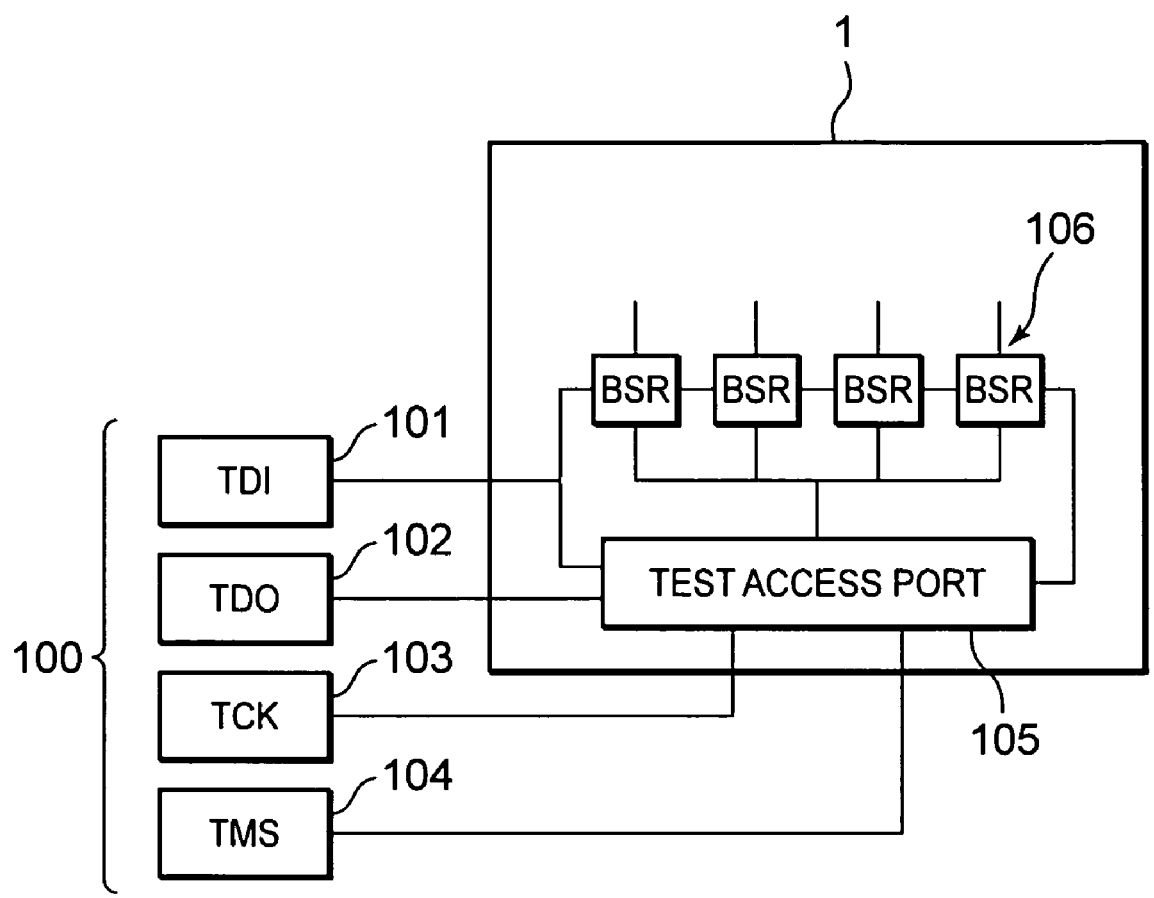
FIG. 2 is a schematic circuit diagram for describing the interface corresponding to the JTAG.
Figure 3:
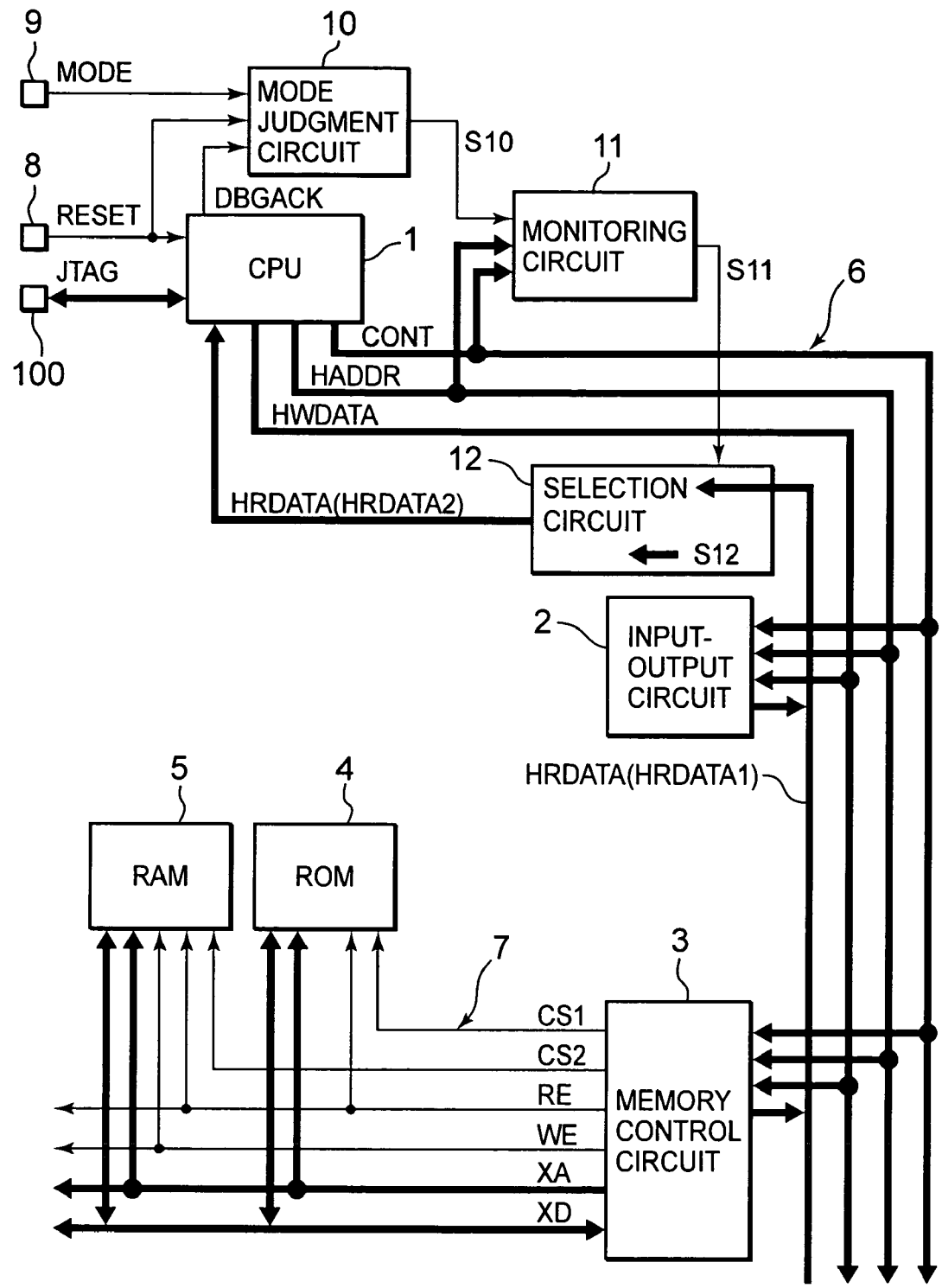
FIG. 3 is a circuit block diagram for describing a semiconductor integrated circuit in the central processing system according to a first preferred embodiment of the present invention.

FIG. 3 is a circuit block diagram for describing a debugging circuit in a central processing system according to a first preferred embodiment of the present invention. The debugging circuit in the central processing system has a CPU 1, an input-output circuit 2, a memory control circuit 3, memory circuits including a ROM 4 and a RAM 5, a data bus 6, a memory bus 7, a reset signal input terminal 8, a mode signal input terminal 9, a mode judgment circuit 10, a monitoring circuit 11, a selection circuit 12 and test access ports 100 which correspond to an JTAG interface. The CPU 1 of the debugging circuit controls at least one peripheral circuit which is coupled to the input-output circuit 2. That is, the CPU 1 accesses the peripheral circuit to give an instruction signal to it. In addition, the peripheral circuit may be an external memory circuit or a photographic image output circuit. The CPU 1 operates in a normal operational mode and a debugging operation mode. The CPU 1 executes a predetermined program in accordance with an instruction code output from the ROM 4 or an external instruction code output from the external memory circuit in the normal operational mode. Meanwhile, the CPU 1 operates in accordance with debug data which are input to the CPU 1 through the JTAG interface in the debugging operation mode. The mode signal input terminal 9, the mode judgment circuit 10, the monitoring circuit 11 and the selection circuit 12 constitute a debugging preparation circuit which operates in accordance with the JTAG interface.

Each of the configurations in the debugging circuit is described in detail below.

The mode signal input terminal 9 receives a mode signal MODE. Either the normal operational mode or the debugging operation mode is selected by the mode signal MODE in the central processing system. That is, the mode signal MODE is asserted when the CPU 1 operates in the debugging operation mode. Also, the mode signal MODE is negated when the CPU 1 operates in the normal operational mode. The reset signal input terminal 8 receives a reset signal RESET. When the reset signal RESET is asserted, the CPU 1 is reset. Meanwhile, when the reset signal RESET is negated, the reset of the CPU 1 is canceled and then the CPU 1 begins to operate in the normal operational mode.

Figure 4:
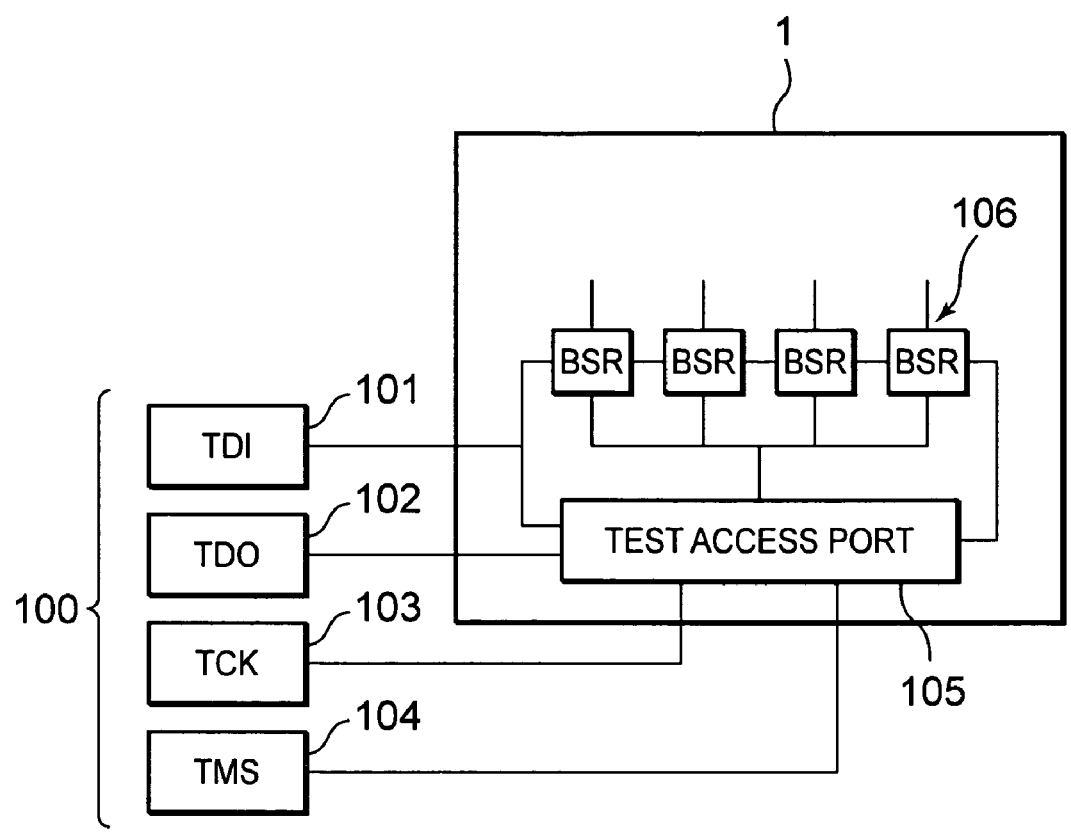
FIG. 4 is a schematic circuit diagram for describing the JTAG interface between the CPU and the test access ports in FIG. 3.

The CPU 1 accesses the ROM 4 and the RAM 5 of the memory circuits through the data bus 6, the memory control circuit 3 and the memory bus 7 in order to execute the predetermined program in accordance with the instruction code output from the ROM 4 or in order to transfer an output signal as the execution of the predetermined program to the RAM 5. Alternatively, the CPU 1 accesses the peripheral circuit such as the external memory circuit through the data bus 6 and the input-output circuit 2 in order to execute the predetermined program in accordance with the external instruction code output from the external memory circuit. The CPU 1 has an after-mentioned control register 106 coupled to the test access ports 100 which correspond to the JTAG interface as shown in FIG. 4. After the reset of the CPU 1 is canceled, the control register 106 of the CPU 1 receives the debug data which are serially transported through the test access ports 100. When the contents of the control register 106 are rewritten by the debug data, the CPU 1 asserts a debug acknowledge signal DBGACK and then suspends the normal operation mode, to operate in the debugging operation mode. Meanwhile, when the contents of the control register 106 have not been rewritten by the debug data, the CPU 1 negates the debug acknowledge signal DBGACK and then operates in the normal operational mode.

FIG. 4 is a schematic circuit diagram for describing the JTAG interface between the CPU 1 and the test access ports 100 in FIG. 3. The test access ports 100 consists of a test data input port 101 (hereinafter referred to as "TDI port 101"), a test data output port 102 (hereinafter referred to as "TDO port 102"), a test clock port 103 (hereinafter referred to as "TCK port 103") and a test mode select port 104 (hereinafter referred to as "TMS port 104"). The CPU 1 has a test access port interface 105 (hereinafter referred to as "TAP interface") and the control register 106. The TAP interface 105 is coupled between the test access ports 100 and the control register 106. The control register 106 in the CPU 1 consists of a plurality of boundary scanning registers BSR of the JTAG interface. The boundary scanning registers BSR include a data serial input register, a data serial output register, and a register which functions as a latch circuit. Each of the boundary scanning registers BSR functions not only as a shift register which executes serial transfer of the debug data in accordance with a control signal which is output from the TAP interface 105, but also as a parallel register with respect to the data in the CPU 1. The test data input port 101 is coupled to the data serial input register of the control register 106 and the TAP interface 105. The TDI port 102, the TCK port 103 and the TMS port 104 are coupled to the TAP interface 105. Also, the data serial output register of the control register 106 is coupled to the TAP interface 105. The debug data are serially transported to the control register 106 through the TDI port 101, and the test instruction code data are serially transported to the TAP interface 105 through the TDI port 101. The TCK port 103 receives a test clock signal to be input to the TAP interface 105, and the TMS port 104 receives a test mode select signal TMS to be input to the TAP interface 105. The TDO port 102 receives a serial data output signal from the control register 106 through the TAP interface 105.

The data bus 6 is coupled between the CPU 1 and the input-output circuit 2 or the memory control circuit 3. The data bus 6 includes an address bus HADDR along which address data output from the CPU 1 are transferred to the input-output circuit 2 or the memory control circuit 3, a writing data bus HWDATA a long which writing data to be written in the RAM 5 are transferred from the CPU 1 to the input-output circuit 2 or the memory control circuit 3, a reading data bus HRDATA along which the instruction code output from the ROM 4 or the external instruction code output from the external memory circuit is transferred to the CPU 1, and a plurality of data bus control signal lines CONT along which a plurality of data bus control signals DBC are transferred. The data bus control signals DBC are output from the CPU 1 when the CPU 1 executes the predetermined program. Hereupon, the data bus control signals DBC control the address bus HADDR, the writing data bus HWDATA and the reading data bus HRDATA. Furthermore, in this example, the reading data bus HRDATA is divided into a first reading data bus HRDATA1 and a second reading data bus HRDATA2 by the selection circuit 12. The first reading data bus HRDATA1 is coupled between the selection circuit 12 and the input-output circuit 2 or the memory control circuit 3, and the second reading data bus HRDATA2 is coupled between the CPU 1 and the selection circuit 12.

The memory bus 7 is coupled between the memory control circuit 3 and the ROM 4 or the RAM 5. The memory bus 7 includes a memory address bus XA, a memory data bus XD, a read enable line RE, a write enable line WE, a first memory select line CS1 and a second memory select line CS2. Along the memory address bus XA, memory address data are transferred from the memory control circuit 3 to the ROM 4 or the RAM 5. Along the memory data bus XD, the instruction code read out from the ROM 4 or the data read out from the RAM 5 are transferred to the memory control circuit 3 or the writing data output from the memory control circuit 3 are transferred to the RAM 5. Along the read enable line RE, a read enable signal which enables readout operations of the ROM 4 and the RAM 5 is transferred. Along the write enable line WE, a write enable signal which enables a writing operation of the RAM 5 is transferred. Along the first memory select line CS1, a first memory select signal which selects the ROM 4 is transferred from the memory control circuit 3 to the ROM 4. Along the second memory select line CS2, a second memory select signal which selects the RAM 5 is transferred from the memory control circuit 3 to the RAM 5. The memory address bus XA, the memory data bus XD, the read enable line RE and the first memory select line CS1 of the memory bus 7 couple the memory control circuit 3 to the ROM 4. Also, the memory address bus XA, the memory data bus XD, the read enable line RE, the write enable line WE and the second memory select line CS2 of the memory bus 7 couple the memory control circuit 3 to the RAM 5. In addition, when an SRAM is used for the debugging operation instead of the ROM 4, the write enable line WE is also coupled to the SRAM.

The input-output circuit 2 functions as an interface circuit between the data bus 6 and the peripheral circuit. When the CPU 1 accesses the peripheral circuit through the input-output circuit 2 in accordance with the address data transferred along the address bus HADDR, the writing data transferred along the writing data bus HWDATA is output to the peripheral circuit through the input-output circuit 2 or the data read out from the peripheral circuit (for example, the external instruction code output from the external memory circuit) is input to the CPU 1 through the reading data bus HRDATA. The memory control circuit 3 functions as an interface circuit between the data bus 6 and the memory bus 7. When the CPU 1 accesses the ROM 4 or the RAM 5 through the memory control circuit 3 in accordance with the address data transferred along the address bus HADDR, the writing data transferred along the writing data bus HWDATA is output to the memory data bus XD through the memory control circuit 3 or the data read out from the ROM 4 or the RAM 5 is output to the reading data bus HRDATA through the memory control circuit 3.

The ROM 4 stores instruction code corresponding to the predetermined program which is executed by the CPU 1 after the cancellation of the reset of the CPU 1. In addition, the SRAM may be used instead of the ROM 4 for debugging during a program development, because modification of the program can be easily realized in the SRAM. The RAM 5 stores working data of the CPU 1 or the external instruction code which are transferred from the external memory circuit through the input-output circuit 2.

The mode judgment circuit 10 is coupled to the reset signal input terminal 8, the mode signal input terminal 9 and the CPU 1 in order to receive the reset signal RESET, the mode signal MODE and the debug acknowledge signal DBGACK. The mode judgment circuit 10 generates a mode judgment signal S10 based on the reset signal RESET, the mode signal MODE and the debug acknowledge signal DBGACK. The mode judgment signal S10 indicates that the CPU 1 is preparing to debug the predetermined program. When the reset signal RESET is negated with the mode signal MODE asserted and with the debug acknowledge signal DBGACK negated, the mode judgment signal S10 is asserted. Meanwhile, when the debug acknowledge signal DBGACK is asserted with the mode signal MODE asserted and with the reset signal RESET negated, the mode judgment signal S10 is negated.

The monitoring circuit 11 is coupled to the mode judgment circuit 10 so as to receive the mode judgment signal S10 and coupled to the CPU 1 through the data bus control signal lines CONT and the address bus HADDR so as to receive the data bus control signals DBC and the address data. Furthermore, the monitoring circuit 11 is coupled to the selection circuit 12 to generate a monitoring signal S11 for the selection circuit 12, based on the mode judgment signal S10, the data bus control signals DBC and the address data. That is, the monitoring circuit 11 monitors whether the CPU 1 attempts to execute the predetermined program or not, in accordance with the data bus control signals DBC and the address data. When the CPU 1 attempts to execute the predetermined program with the mode judgment signal S10 asserted, the monitoring circuit 11 asserts the monitoring signal S11. Meanwhile, when the CPU 1 cancels the attempt to execute the predetermined program, the monitoring circuit 11 negates the monitoring signal S11. In addition, when the mode judgment signal S10 is negated, the monitoring circuit 11 does not assert the monitoring signal S11 regardless of the above-described attempt by the CPU 1.

The selection circuit 12 is coupled to the monitoring circuit 11 so as to generate a command signal S12 based on the monitoring signal S11. The command signal S12 makes the CPU 1 to receive an output signal from the CPU 1 as an input signal without change, so-called "a self-looped operation", in order to prevent the CPU 1 from executing the predetermined program during the debugging preparation. The selection circuit 12 selectively outputs either the command signal S12 or the instruction code output from the ROM 4. Alternatively, the selection circuit 12 selectively outputs either the command signal S12 or the external instruction code output from the external memory circuit. The selection circuit 12 stores command code which corresponds to a command signal S12. When the monitoring signal S11 is asserted by the monitoring circuit 11, the selection circuit 12 outputs the command signal S12 to the CPU 1 through the second reading data bus HRDATA2. Meanwhile, when the monitoring signal S11 is negated, the selection circuit 12 couples the first reading data bus HRDATA1 to the second reading data bus HRDATA2.

The operation of the debugging circuit in the central processing system according to the first preferred embodiment of the present invention is described below.

Figure 5:
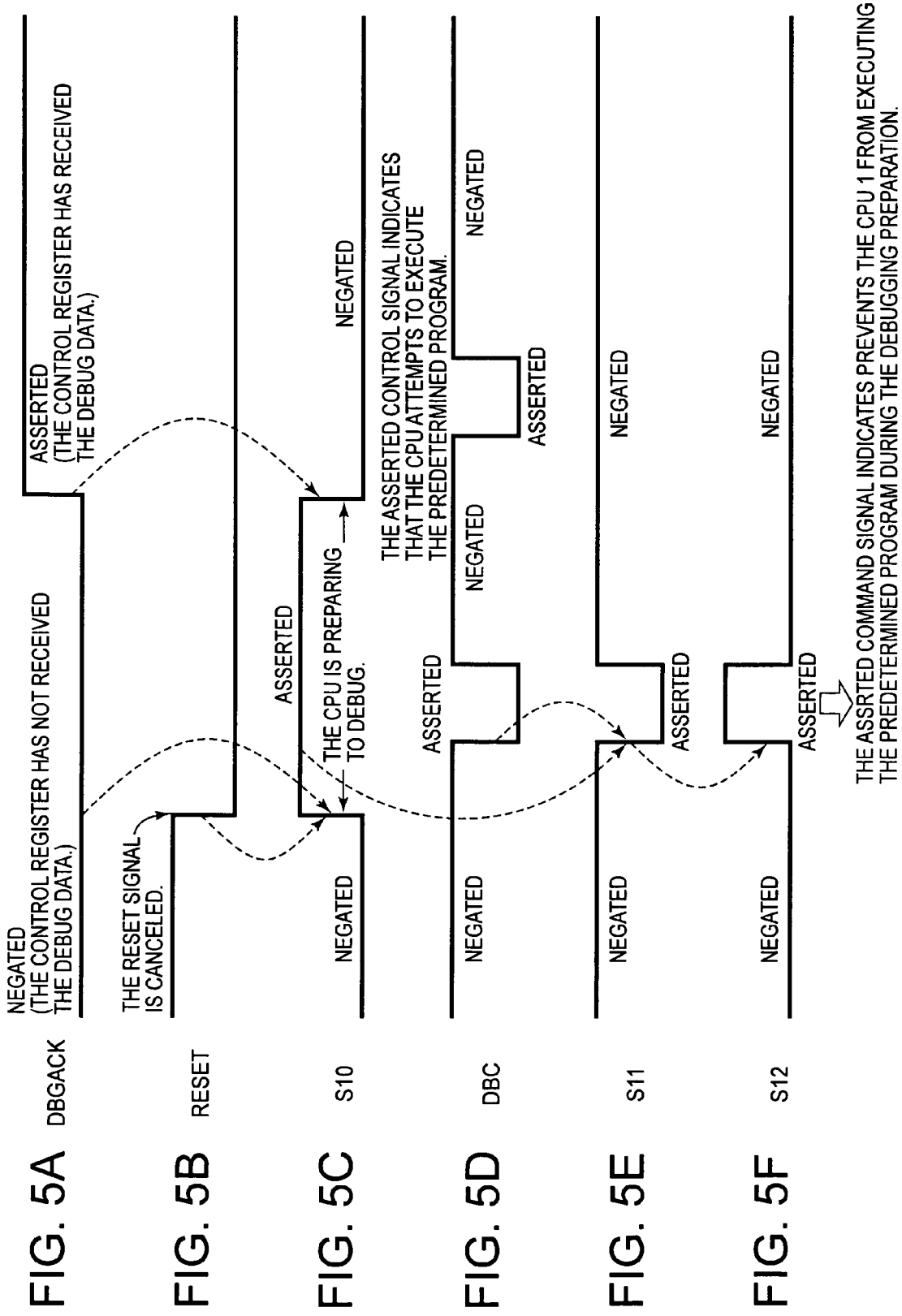
FIGS. 5A through 5F are signal waveform diagrams for describing the operation of the debugging circuit in FIG. 3.

FIGS. 5A through 5F are signal waveform diagrams for describing the operation of the debugging circuit in FIG. 3. FIG. 5A represents a waveform of the debug acknowledge signal DBGACK, FIG. 5B represents a waveform of the reset signal RESET, FIG. 5C represents a waveform of the mode judgment signal S10, FIG. 5D represents a waveform of the data bus control signal DBC, FIG. 5E represents a waveform of the monitoring signal S11, and FIG. 5F represents a waveform of the command signal S12.

First of all, the mode signal MODE is asserted so that the CPU 1 operates in the debugging mode, when the reset signal RESET has been asserted so that the CPU 1 is kept reset. At this time, the mode judgment signal S10 is kept negated in accordance with the reset signal RESET, and the debug acknowledge signal DBGACK is kept negated to indicate the control register 106 of the CPU 1 has not received the debug data. When the reset signal RESET is negated to cancel the reset of the CPU 1 with the mode signal MODE asserted and with the debug acknowledge signal DBGACK negated as shown in FIGS. 5A and 5B, the mode judgment signal S10 is asserted to indicate that the CPU 1 is preparing to debug the predetermined program as shown in FIG. 5C.

After the reset signal RESET is negated, that is, after the reset of the CPU 1 is canceled, the CPU 1 may attempt to execute the predetermined program in accordance with the instruction code stored in the ROM 4 or the external instruction code output from the external memory circuit. When the CPU 1 attempts to execute the predetermined program, the data bus control signal DBC is asserted as shown in FIG. 5D. At this time, since the mode judgment signal S10 is asserted, the monitoring signal S11 is asserted to indicate that the CPU 1 attempts to execute the predetermined program during the debugging preparation, based on the asserted data bus control signal DBC and the asserted mode judgment signal S10 as shown in FIG. 5E. When the asserted monitoring signal S11 is input to the selection circuit 12, the command signal S12 is asserted as shown in FIG. 5F and then transferred to the CPU 1 through the second reading data bus HRDATA2. Therefore, when the CPU 1 attempts to access the ROM 4 or the external memory circuit in order to execute the predetermined program, the CPU 1 operates in accordance with the command code stored in the selection circuit 12. That is, the CPU 1 does not execute the predetermined program but receives the output signal from the CPU 1 as the input signal without change during the debugging preparation. As described above, the CPU 1 receives the command signal S12 from the selection circuit 12 and then executes the self-looped operation from the cancellation of the reset of the CPU 1 till the completion of the debugging preparation.

Thereafter, the control register 106 of the CPU 1 receives the debug data which are serially transferred from the JTAG interface and then the debugging preparation is completed. At this time, the debug acknowledge signal DBGACK is asserted with the mode signal MODE asserted and with the reset signal RESET negated, in order to indicate that the control register 106 has already received the debug data, as shown in FIG. 5A. Then, the mode judgment signal S10 is negated to indicate that the debugging preparation is completed in accordance with the asserted debug acknowledge signal DBGACK as shown in FIG. 5C. Therefore, the monitoring circuit 11 does not assert the monitoring signal S11 in accordance with the negated mode judgment signal S10, even if the data bus control signal DBC is asserted to indicate that the CPU 1 attempts to execute the predetermined program. Accordingly, the selection circuit 12 couples the first reading data bus HRDATA1 to the second reading data bus HRDATA2, so that the CPU 1 can execute the predetermined program in accordance with the instruction code stored in the ROM 4 or the external instruction code output from the external memory circuit. That is, the predetermined program can be debugged by the debug data input to the control register 106 of the CPU 1 in the debugging operation mode.

Also, when the SRAM is used instead of the ROM 4 for debugging during a program development, a predetermined program to be executed by the CPU 1 is transferred from the JTAG interface to the SRAM through the control register 106 of the CPU 1 after the completion of the debugging preparation. Even in this case, according to the first preferred embodiment, the CPU 1 is prevented from executing the indeterminate predetermined program stored in the SRAM from the cancellation of the reset of the CPU 1 till the completion of the debugging preparation. In addition, when the mode signal MODE is negated so that the debugging circuit operates in the normal operational mode, the mode judgment circuit 10 does not assert the mode judgment signal S10 regardless of the cancellation of the reset of the CPU 1. Therefore, the monitoring circuit 11 does not assert the monitoring signal S11 even if the CPU 1 attempts to execute the predetermined program. Accordingly, the first reading data bus HRDATA1 is coupled to the second reading data bus HRDATA2 by the selection circuit 12. As a result, the CPU 1 can properly access the ROM 4 or the external memory circuit as soon as the cancellation of the reset of the CPU 1.

According to the first preferred embodiment, the debugging circuit includes the mode judgment circuit which judges whether the control register of the CPU has received the debug data after the cancellation of the reset of the CPU, the monitoring circuit which monitors the attempt by the CPU to execute the predetermined program, and the selection circuit which prevents the CPU from executing the predetermined program during the debugging preparation. That is, the CPU can not access the ROM or the external memory circuit in order to execute the predetermined program, from the cancellation of the reset of the CPU till the completion of the debugging preparation. Therefore, the debugging operation of the CPU can be properly executed after the cancellation of the reset of the CPU.

Also, since the CPU is prevented from executing the predetermined program during the debugging preparation, the peripheral circuit controlled by the CPU in the central processing system can be prevented from operating unnecessarily during the debugging preparation. Furthermore, even if the SRAM is used instead of the ROM, the CPU may be prevented from running out of control during the debugging preparation. Accordingly, the peripheral circuit may be prevented from executing the unpredictable operation.

Figure 6:
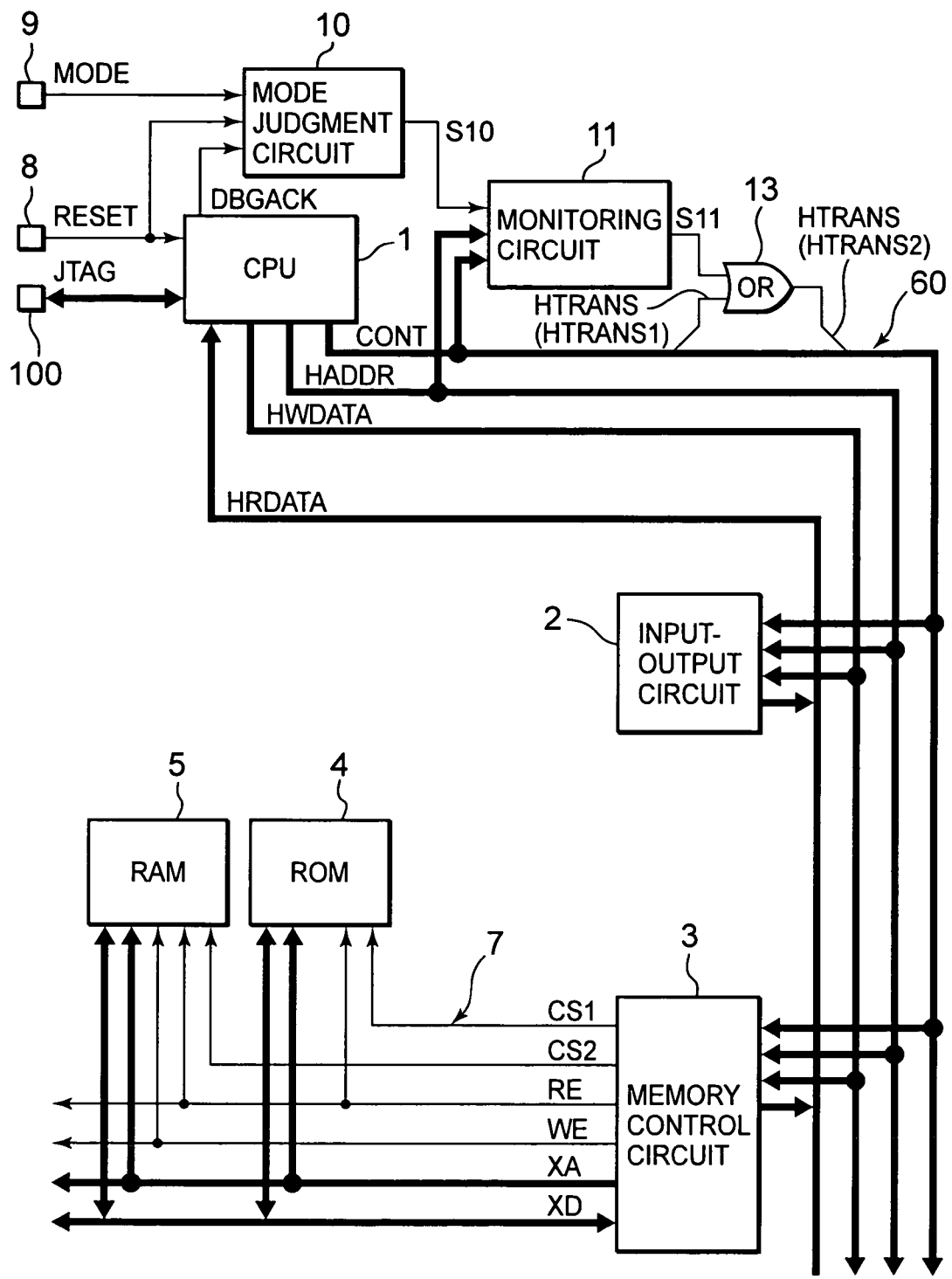
FIG. 6 is a schematic circuit diagram for describing a debugging circuit in a central processing system according to a second preferred embodiment of the present invention.

FIG. 6 is a schematic circuit diagram for describing a debugging circuit in a central processing system according to a second preferred embodiment of the present invention. The debugging circuit according to the second preferred embodiment has a data bus 60 which is different than the data bus 6 according to the first preferred embodiment. Furthermore, the debugging circuit according to the second preferred embodiment has an OR circuit 13 as the selection circuit 12 according to the first preferred embodiment. The other configurations of the debugging circuit according to the second preferred embodiment are the same as those according to the first preferred embodiment. The mode signal input terminal 9, the mode judgment circuit 10, the monitoring circuit 11 and the OR circuit 13 constitute a debugging preparation circuit which operates in accordance with the JTAG interface.

The data bus 60 is coupled between the CPU 1 and the input-output circuit 2 or the memory control circuit 3. The data bus 60 includes an address bus HADDR along which address data output from the CPU 1 are transferred to the input-output circuit 2 or the memory control circuit 3, a writing data bus HWDATA along which writing data to be written in the RAM 5 are transferred from the CPU 1 to the input-output circuit 2 or the memory control circuit 3, a reading data bus HRDATA along which the instruction code output from the ROM 4 or the external instruction code output from the external memory circuit is transferred from the memory control circuit 3 or the input-output circuit 2 to the CPU 1, and a plurality of data bus control signal lines CONT along which a plurality of data bus control signals DBC are transferred. The data bus control signals DBC are output from the CPU 1 when the CPU 1 executes the predetermined program. Hereupon, the data bus control signal lines CONT include a first data transfer control line HTRANS1 and a second data transfer control line HTRANS2, and the data bus control signals DBC include a first data transfer control signal TRANS1. The first data transfer control line HTRANS1 and the second data transfer control line HTRANS2 are coupled to each other through the OR circuit 13. The first data transfer control signal TRANS1 is transferred along the first data transfer control line HTRANS1. After the first data transfer control signal TRANS1 is input to the OR circuit 13, the first data transfer control signal TRANS1 is output from the OR circuit 13 as a second data transfer control signal TRANS2. The second data transfer control signal TRANS2 is transferred along the second data transfer control line HTRANS2 to the input-output circuit 2 or the memory control circuit 3. The first and second data transfer control signals TRANS1 and TRANS2 control a request motion of a data transfer output from the CPU 1. The CPU 1 turns the first data transfer control line HTRANS1 to an idle state when the CPU 1 does not generate the request motion of the data transfer. On the other hand, the CPU 1 turns the first data transfer control line HTRANS1 to an active state when the CPU 1 generates the request motion of the data transfer. The input-output circuit 2 and the memory control circuit 3 operate responsive to the request motion of the data transfer when the first data transfer control line HTRANS1 is turned to the active state and electrically coupled to the second data transfer control line HTRANS2 through the OR circuit 13.

The OR circuit 13 is coupled to the monitoring circuit 11 so as to receive the monitoring signal S11 and coupled to the CPU 1 through the first data transfer control line HTRANS1 so as to receive the first data transfer control signal TRANS1. Also, the OR circuit 13 is coupled to the second data transfer control line HTRANS2 so as to provide the second data transfer control signal TRANS2 to input-output circuit 2 or the memory control circuit 3. When the first data transfer control line HTRANS1 is kept at the idle state or the monitoring signal S11 is kept asserted, the OR circuit 13 turns the second data transfer control line HTRANS2 to the idle state. When the first data transfer control line HTRANS1 is kept at the active state or the monitoring signal S11 is kept negated, the OR circuit 13 turns the second data transfer control line HTRANS2 to the active state.

The operation of the debugging circuit in the central processing system according to the second preferred embodiment of the present invention is described below.

Figure 7:
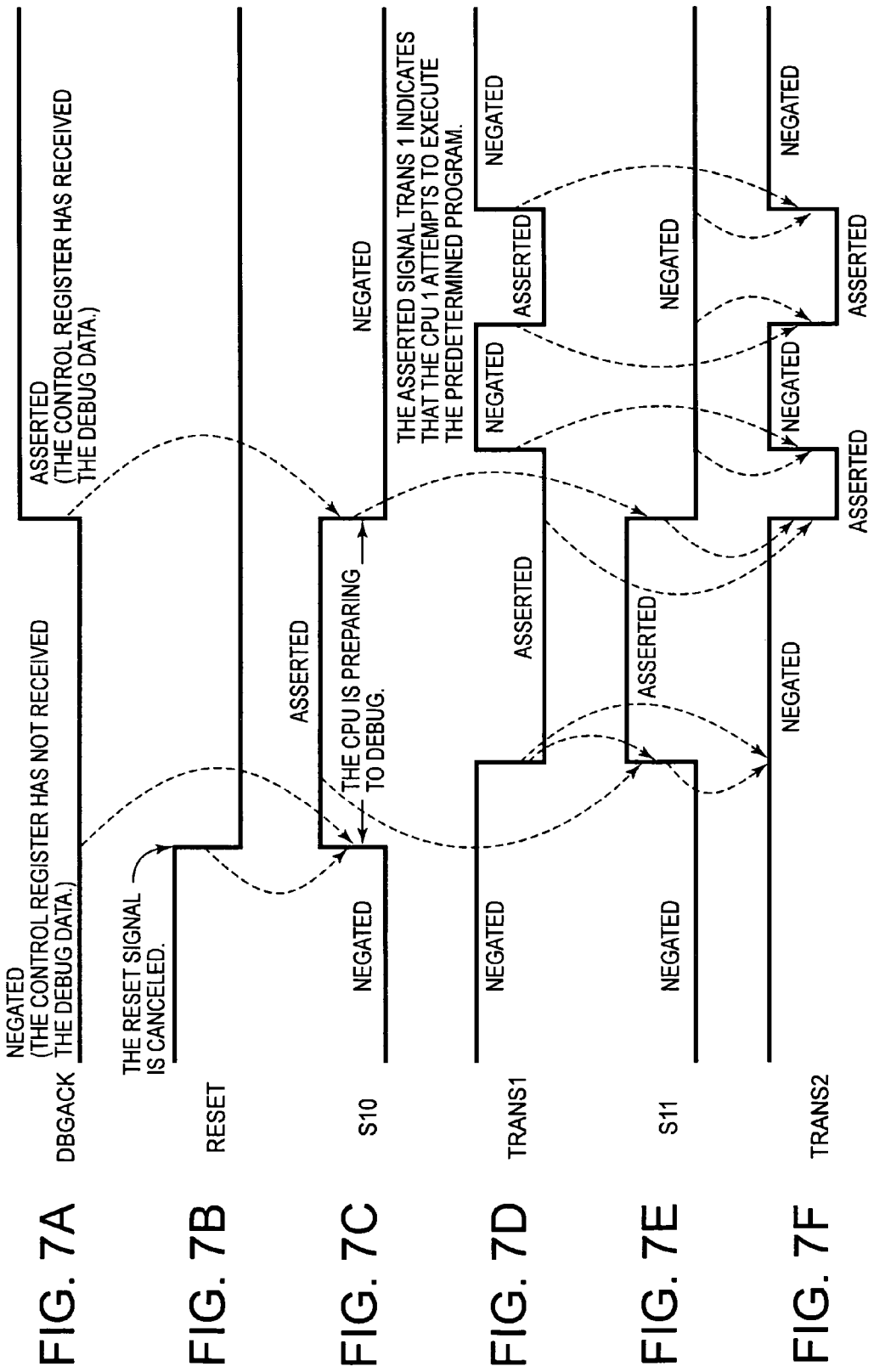
FIGS. 7A through 7F are signal waveform diagrams for describing the operation of the debugging circuit in FIG. 6.

FIGS. 7A through 7F are signal waveform diagrams for describing the operation of the debugging circuit in FIG. 7. FIG. 7A represents a waveform of the debug acknowledge signal DBGACK, FIG. 7B represents a waveform of the reset signal RESET, FIG. 7C represents a waveform of the mode judgment signal S10, FIG. 7D represents a waveform of the first data transfer control signal TRANS1, FIG. 7E represents a waveform of the monitoring signal S11, and FIG. 7F represents a waveform of the second data transfer control signal TRANS2.

First of all, the mode signal MODE is asserted so that the CPU 1 operates in the debugging mode, when the reset signal RESET has been asserted so that the CPU 1 is kept reset. At this time, the mode judgment signal S10 is kept negated in accordance with the reset signal RESET, and the debug acknowledge signal DBGACK is kept negated to indicate the control register 106 of the CPU 1 has not received the debug data. Also, since the first data transfer control signal TRANS1 is negated, each of the monitoring signal S11 and the second data transfer control signal TRANS2 is kept negated.

Then, the reset signal RESET is negated to cancel the reset of the CPU 1 while the mode signal MODE is kept asserted and the debug acknowledge signal DBGACK is kept negated, as shown in FIGS. 7A and 7B. Thus, the mode judgment signal S10 is asserted to indicate that the CPU 1 is preparing to debug the predetermined program as shown in FIG. 7C. Just after the mode judgment signal S10 is asserted, the CPU 1 does not attempt to access the external memory circuit or the ROM 4 in order to execute the predetermined program. At this time, the first data transfer control signal TRANS1 is negated, and thus the monitoring signal S11 is negated as shown in FIG. 7E. Therefore, the second data transfer control signal TRANS2 is kept negated as shown in FIG. 7F, as well as before the cancellation of the reset of the CPU 1.

After the reset signal RESET is negated, that is, after the reset of the CPU 1 is canceled, the CPU 1 may attempt to execute the predetermined program in accordance with the instruction code stored in the ROM 4 or the external instruction code output from the external memory circuit. When the CPU 1 attempts to execute the predetermined program, the first data transfer control signal TRANS1 is asserted as shown in FIG. 7D. At this time, since the mode judgment signal S10 is asserted, the monitoring signal S11 is asserted, as shown in FIG. 7E, to indicate that the CPU 1 attempts to execute the predetermined program during the debugging preparation, based on the asserted first data transfer control signal TRANS1 and the asserted mode judgment signal S10. The CPU 1 turns the first data transfer control line HTRANS1 to the idle state just after the cancellation of the reset of the CPU 1, and turns the first data transfer control line HTRANS1 to the active state when the CPU 1 generates the request motion of the data transfer. However, in this example, when the monitoring signal S11 is asserted with the first data transfer control line HTRANS1 kept at the active state, the OR circuit 13 keeps the second data transfer control line HTRANS2 at the idle state. That is, when the monitoring signal S11 is asserted, the OR circuit 13 keeps the second data transfer control signal TRANS2 negated as shown in FIG. 7F. Therefore, the input-output circuit 2 and the memory control circuit 3 do not operate even when the CPU 1 attempts to access the external memory circuit or the ROM 4 in order to execute the predetermined program. That is, the CPU 1 does not execute the predetermined program but stands by for executing the predetermined program in accordance with the instruction code stored in the ROM 4 or the external instruction code stored in the external memory circuit, during the debugging preparation.

Thereafter, the control register 106 of the CPU 1 receives the debug data which are serially transferred from the JTAG interface and then the debugging preparation is completed. At this time, the debug acknowledge signal DBGACK is asserted with the mode signal MODE asserted and with the reset signal RESET negated, in order to indicate that the control register 106 has already received the debug data, as shown in FIG. 7A. Then, the mode judgment signal S10 is negated to indicate that the debugging preparation is completed in accordance with the asserted debug acknowledge signal DBGACK as shown in FIG. 7C. Therefore, the monitoring circuit 11 does not assert the monitoring signal S11 in accordance with the negated mode judgment signal S10. At this time, if the first data transfer control signal TRANS1 is asserted to indicate that the CPU 1 attempts to execute the predetermined program as shown in FIG. 7D, the OR circuit 13 turns the second data transfer control line HTRANS2 to the active state. That is, the second data transfer control signal TRANS2 is asserted as shown in FIG. 7F, so that the CPU 1 can execute the predetermined program in accordance with the instruction code stored in the ROM 4 or the external instruction code stored in the external memory circuit. Thus, the predetermined program can be properly debugged by the debug data input to the control register 106 of the CPU 1 in the debugging operation mode.

After that, the first data transfer control signal TRANS1 is negated. On the other hand, since the mode judgment signal S10 is kept negated as shown in FIG. 7C, the monitoring signal S11 is kept negated. Therefore, the second data transfer control signal TRANS2 is negated as shown in FIG. 7F, based on the negated first data transfer control signal TRANS1 and the negated monitoring signal S11. Furthermore, when the CPU 1 attempts to execute the predetermined program, the first data transfer control signal TRANS1 is asserted again as shown in FIG. 7D. Since the mode judgment signal S10 is kept negated at this time as shown in FIG. 7C, the monitoring signal S11 is still kept negated. Therefore, the second data transfer control signal TRANS2 is asserted as shown in FIG. 7F, based on the negated first data transfer control signal TRANS1 and the negated monitoring signal S11. Then, the CPU 1 can execute the predetermined program in accordance with the instruction code stored in the ROM 4 or the external instruction code stored in the external memory circuit.

Also, when the SRAM is used instead of the ROM 4 for debugging during a program development, a predetermined program to be executed by the CPU 1 is transferred from the JTAG interface to the SRAM through the control register 106 of the CPU 1 after the completion of the debugging preparation. Even in this case, according to the first preferred embodiment, the CPU 1 is prevented from executing the indeterminate predetermined program stored in the SRAM from the cancellation of the reset of the CPU 1 till the completion of the debugging preparation. In addition, when the mode signal MODE is negated so that the debugging circuit operates in the normal operational mode, the mode judgment circuit 10 does not assert the mode judgment signal S10 regardless of the cancellation of the reset of the CPU 1. Therefore, the monitoring circuit 11 does not assert the monitoring signal S11 even if the CPU 1 attempts to execute the predetermined program. Accordingly, when the first data transfer control line HTRANS1 is turned to the active state in accordance with the request motion of the data transfer from the CPU 1, the OR circuit 13 turns the second data transfer control line HTRANS2 to the active state. As a result, the CPU 1 can properly access the ROM 4 or the external memory circuit as soon as the cancellation of the reset of the CPU 1.

According to the second preferred embodiment, the debugging circuit includes the mode judgment circuit which judges whether the control register of the CPU has received the debug data after the cancellation of the reset of the CPU, the monitoring circuit which monitors the attempt by the CPU to execute the predetermined program, and the OR circuit which prevents the CPU from executing the predetermined program by turning the second data transfer control line to the idle state during the debugging preparation. That is, the CPU can not access the ROM or the external memory circuit in order to execute the predetermined program, from the cancellation of the reset of the CPU till the completion of the debugging preparation. Therefore, the debugging operation of the CPU can be properly executed after the cancellation of the reset of the CPU. Besides, since the instruction code stored in the ROM or the external instruction code stored in the external memory circuit can not appear on the data bus and the memory bus at this time, the debugging operation of the CPU may be more properly executed after the cancellation of the reset of the CPU.

Also, since the CPU is prevented from executing the predetermined program during the debugging preparation, the peripheral circuit controlled by the CPU in the central processing system can be prevented from operating unnecessarily during the debugging preparation. Furthermore, even when the SRAM is used instead of the ROM, the CPU may be prevented from running out of control during the debugging preparation. Accordingly, the peripheral circuit may be prevented from executing the unpredictable operation.

Figure 8:
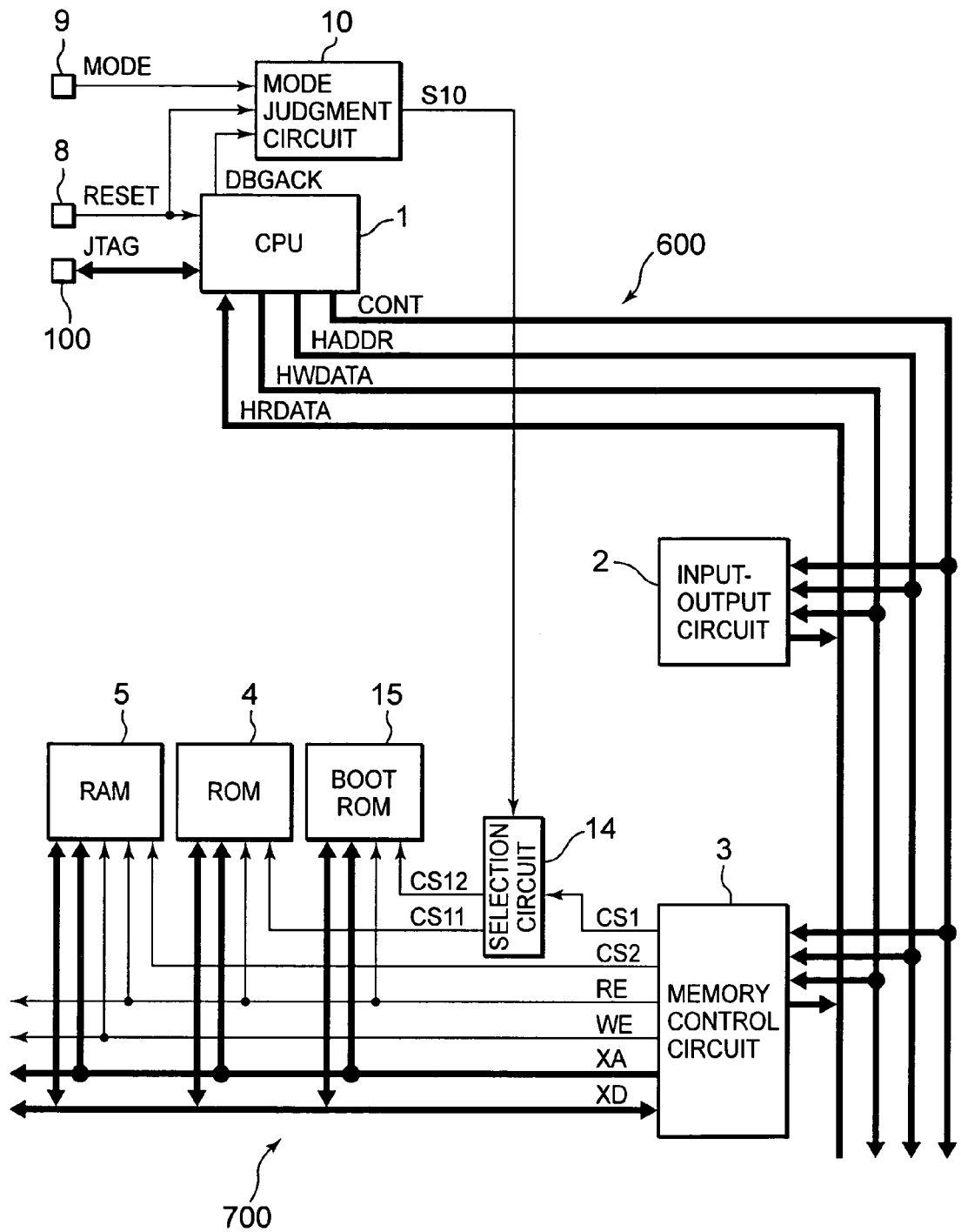
FIG. 8 is a schematic circuit diagram for describing a debugging circuit in a central processing system according to a third preferred embodiment of the present invention.

FIG. 8 is a schematic circuit diagram for describing a debugging circuit in a central processing system according to a third preferred embodiment of the present invention. The debugging circuit according to the third preferred embodiment has a data bus 600 and a memory bus 700 which are respectively different than the data bus 6 and the memory bus 7 according to the first preferred embodiment. Furthermore, the debugging circuit according to the third preferred embodiment has a selection circuit 14 and a boot ROM 15. In this example, the ROM 4 is a first memory circuit and the boot ROM 15 is a second memory circuit, and the instruction code stored in the first memory circuit is a first instruction code. The first instruction code corresponds to a first program which is executed by the CPU 1. The other configurations of the debugging circuit according to the third preferred embodiment are the same as those according to the first preferred embodiment. The mode signal input terminal 9, the mode judgment circuit 10, the selection circuit 14 and the boot ROM 15 constitute a debugging preparation circuit which operates in accordance with the JTAG interface.

The data bus 600 is coupled between the CPU 1 and the input-output circuit 2 or the memory control circuit 3. The data bus 600 includes an address bus HADDR along which address data output from the CPU 1 are transferred to the input-output circuit 2 or the memory control circuit 3, a writing data bus HWDATA along which writing data to be written in the RAM 5 are transferred from the CPU 1 to the input-output circuit 2 or the memory control circuit 3, a reading data bus HRDATA along which the first instruction code output from the ROM 4 is transferred from the memory control circuit 3 to the CPU 1, and a plurality of data bus control signal lines CONT along which a plurality of data bus control signals DBC are transferred. The data bus control signals DBC are output from the CPU 1 to the memory control circuit 3 when the CPU 1 executes the first program. Hereupon, the data bus control signals DBC control the address bus HADDR, the writing data bus HWDATA and the reading data bus HRDATA.

The memory bus 700 is coupled between the memory control circuit 3 and the ROM 4, the RAM 5 or the boot ROM 15. The memory bus 700 includes a memory address bus XA, a memory data bus XD, a read enable line RE, a write enable line WE, a first memory select line CS1, a second memory select line CS2, a first sub memory select line CS11 and a second sub memory select line CS12. Along the memory address bus XA, memory address data are transferred from the memory control circuit 3 to the ROM 4, the RAM 5 or the boot ROM 15. Along the memory data bus XD, the first instruction code read out from the ROM 4 or the data read out from the RAM 5 are transferred to the memory control circuit 3. Alternatively, the writing data output from the memory control circuit 3 are transferred to the RAM 5 along the memory data bus XD. Along the read enable line RE, a read enable signal which enables a readout operation of the ROM 4, the RAM 5 or the boot ROM 15 is transferred. Along the write enable line WE, a write enable signal which enables a writing operation of the RAM 5 is transferred. Along the first memory select line CS1 and the first sub memory select line CS11 or the second sub memory select line CS12, a first memory select signal which selects either the ROM 4 or the boot ROM 15 is transferred from the memory control circuit 3 to the ROM 4. Along the second memory select line CS2, a second memory select signal which selects the RAM 5 is transferred from the memory control circuit 3 to the RAM 5. The memory address bus XA, the memory data bus XD, the read enable line RE, the first memory select line CS1, the first sub memory select line CS11 and the second sub memory select line CS12 of the memory bus 700 couple the memory control circuit 3 to the ROM 4 or the boot ROM 15. Also, the memory address bus XA, the memory data bus XD, the read enable line RE, the write enable line WE and the second memory select line CS2 of the memory bus 700 couple the memory control circuit 3 to the RAM 5.

The selection circuit 14 is coupled between the memory control circuit 3 and the ROM 4 through the first memory select line CS1 and the first sub memory select line CS11. Also, the selection circuit 14 is coupled between the memory control circuit 3 and the boot ROM 15 through the first memory select line CS1 and the second sub memory select line CS12. The selection circuit 14 couples the first memory select line CS1 either to the first sub memory select line CS11 or to the second sub memory select line CS12. That is, either the ROM 4 or the boot ROM 15 is selected by the selection circuit 14. When the mode judgment signal S10 is asserted, the selection circuit 14 couples the first memory select line CS1 to the second sub memory select line CS12. Meanwhile, when the mode judgment signal S10 is negated, the selection circuit 14 couples the first memory select line CS1 to the first sub memory select line CS11. That is, when the mode judgment signal S10 is asserted, the boot ROM 15 is accessed by the CPU 1 instead of the ROM 4, and when the mode judgment signal S10 is negated, the ROM 4 is accessed by the CPU 1.

As described above, the boot ROM 15 is coupled to the memory control circuit 3 through the memory address bus XA, the memory data bus XD, the read enable line RE, the first memory select line CS1 and the second sub memory select line CS12. The boot ROM 15 stores a second instruction code which corresponds to a second program. The second program is different than the first program and is executed by the CPU 1 during the debugging preparation. That is, the CPU 1 executes the self-looped operation in accordance with the second program, from the cancellation of the reset of the CPU 1 till the completion of the debugging preparation.

The operation of the debugging circuit in the central processing system according to the third preferred embodiment of the present invention is described below.

Figure 9:
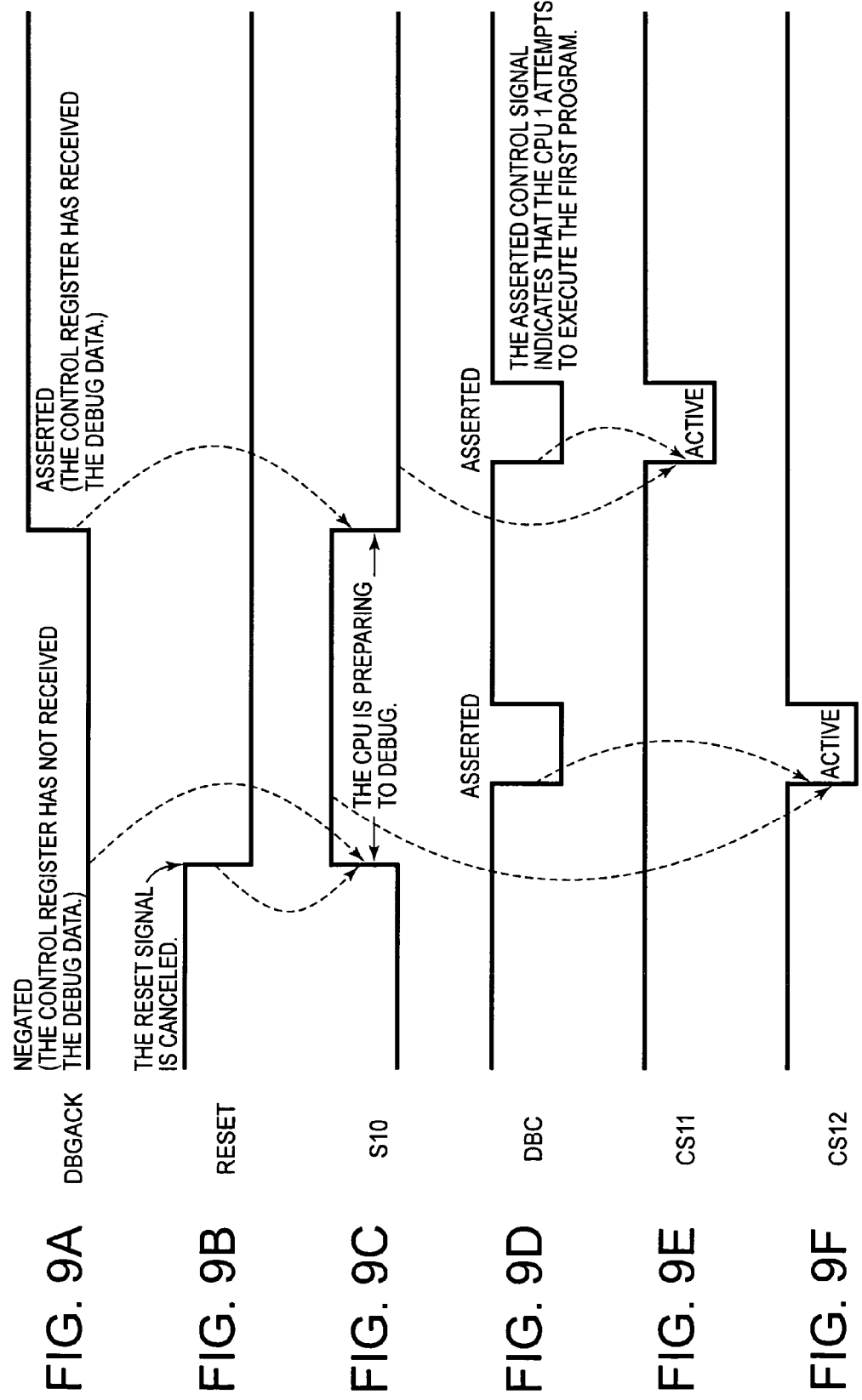
FIGS. 9A through 9F are signal waveform diagrams for describing the operation of the debugging circuit in FIG. 8.

FIGS. 9A through 9F are signal waveform diagrams for describing the operation of the debugging circuit in FIG. 9. FIG. 9A represents a waveform of the debug acknowledge signal DBGACK, FIG. 9B represents a waveform of the reset signal RESET, FIG. 9C represents a waveform of the mode judgment signal S10, FIG. 9D represents a waveform of the data bus control signal DBC, FIG. 9E represents a waveform of the first memory select signal on the first sub memory select signal line CS11, and FIG. 9F represents a waveform of the first memory select signal on the second sub memory select signal line CS12.

First of all, the mode signal MODE is asserted so that the CPU 1 operates in the debugging mode, when the reset signal RESET has been asserted so that the CPU 1 is kept reset. At this time, the mode judgment signal S10 is kept negated in accordance with the reset signal RESET, and the debug acknowledge signal DBGACK is kept negated to indicate the control register 106 of the CPU 1 has not received the debug data.

Then, the reset signal RESET is negated to cancel the reset of the CPU 1 while the mode signal MODE is kept asserted and the debug acknowledge signal DBGACK is kept negated, as shown in FIGS. 9A and 9B. Thus, the mode judgment signal S10 is asserted to indicate that the CPU 1 is preparing to debug the first program as shown in FIG. 9C. After the reset signal RESET is negated, that is, after the reset of the CPU 1 is canceled, the mode judgment signal S10 has been asserted in accordance with the negated debug acknowledge signal DBGACK and the negated reset signal RESET in order to indicate that the CPU 1 is preparing to debug. Accordingly, the selection circuit 14 couples the first memory select line CS1 to the second sub memory select line CS12 during the debugging preparation. Meanwhile, the CPU 1 may attempt to execute the first program in accordance with the first instruction code stored in the ROM 4, from the cancellation of the reset of the CPU 1 till the completion of the debugging preparation. When the CPU 1 attempts to execute the first program, the data bus control signal DBC is asserted as shown in FIG. 9D. At this time, since the first memory select line CS1 is coupled to the second sub memory select line CS12 by the selection circuit 12, not the first instruction code stored in the ROM 4 but the second instruction code stored in the boot ROM is transferred to the CPU 1 through the memory data bus XD, the memory control circuit 3 and the reading data bus HRDATA. Then, the CPU 1 executes the second program in accordance with the second instruction code during the debugging preparation. Since the second instruction code makes the CPU 1 to execute the self-looped operation or to stand by for executing the first program, the first program is prevented from being executed by the CPU 1 during the debugging preparation.

Thereafter, the control register 106 of the CPU 1 receives the debug data which are serially transferred from the JTAG interface and then the debugging preparation is completed. At this time, the debug acknowledge signal DBGACK is asserted with the mode signal MODE asserted and with the reset signal RESET negated, in order to indicate that the control register 106 has already received the debug data, as shown in FIG. 9A. Then, the mode judgment signal S10 is negated to indicate that the debugging preparation is completed in accordance with the asserted debug acknowledge signal DBGACK as shown in FIG. 9C. The selection circuit 14 couples the first memory select line CS1 to the first sub memory select line CS11 so that the ROM 4 is electrically coupled to the memory control circuit 3. Therefore, when the CPU 1 attempts to execute the first program with the debug acknowledge signal DBGACK asserted, the first instruction code stored in the ROM 4 are transferred to the CPU 1 through the memory data bus XD, the memory control circuit 3 and the reading data bus HRDATA. That is, the first program can be properly debugged by the debug data input to the control register 106 of the CPU 1 in the debugging operation mode.

Also, when the SRAM is used instead of the ROM 4 for debugging during a program development, a first program to be executed by the CPU 1 is transferred from the JTAG interface to the SRAM through the control register 106 of the CPU 1 after the completion of the debugging preparation. Even in this case, according to the first preferred embodiment, the CPU 1 is prevented from executing the indeterminate first program stored in the SRAM from the cancellation of the reset of the CPU 1 till the completion of the debugging preparation. In addition, when the mode signal MODE is negated so that the debugging circuit operates in the normal operational mode, the mode judgment circuit 10 does not assert the mode judgment signal S10 regardless of the cancellation of the reset of the CPU 1. Therefore, the first memory select line CS1 is coupled to the first sub memory select line CS11 by the selection circuit 14. As a result, the CPU 1 can properly access the ROM 4 as soon as the cancellation of the reset of the CPU 1.

According to the third preferred embodiment, the debugging circuit includes the mode judgment circuit which judges whether the control register of the CPU has received the debug data after the cancellation of the reset of the CPU, and the selection circuit which couples the CPU to the second memory circuit instead of the first memory circuit in accordance with the asserted mode judgment signal during the debugging preparation. That is, the CPU can not access the first memory circuit but access the second memory circuit to execute the self-looped operation or to stand by for executing the first program, from the cancellation of the reset of the CPU till the completion of the debugging preparation. Therefore, the debugging operation of the CPU can be properly executed after the cancellation of the reset of the CPU. Besides, the first instruction code stored in the first memory circuit can not appear on the data bus and the memory bus at this time, the debugging operation of the CPU can be more properly executed after the cancellation of the reset of the CPU.

Furthermore, since the selection between the first memory circuit and the second memory circuit is executed by the selection circuit without any selection circuit coupled to the data bus, adverse influences on load characteristics of the data bus may be reduced. Also, since the memory bus is not requested to have high performance compared to the data bus, adverse influences with respect to coupling the boot ROM to the memory bus may be kept vanishingly low.

Figure 10:
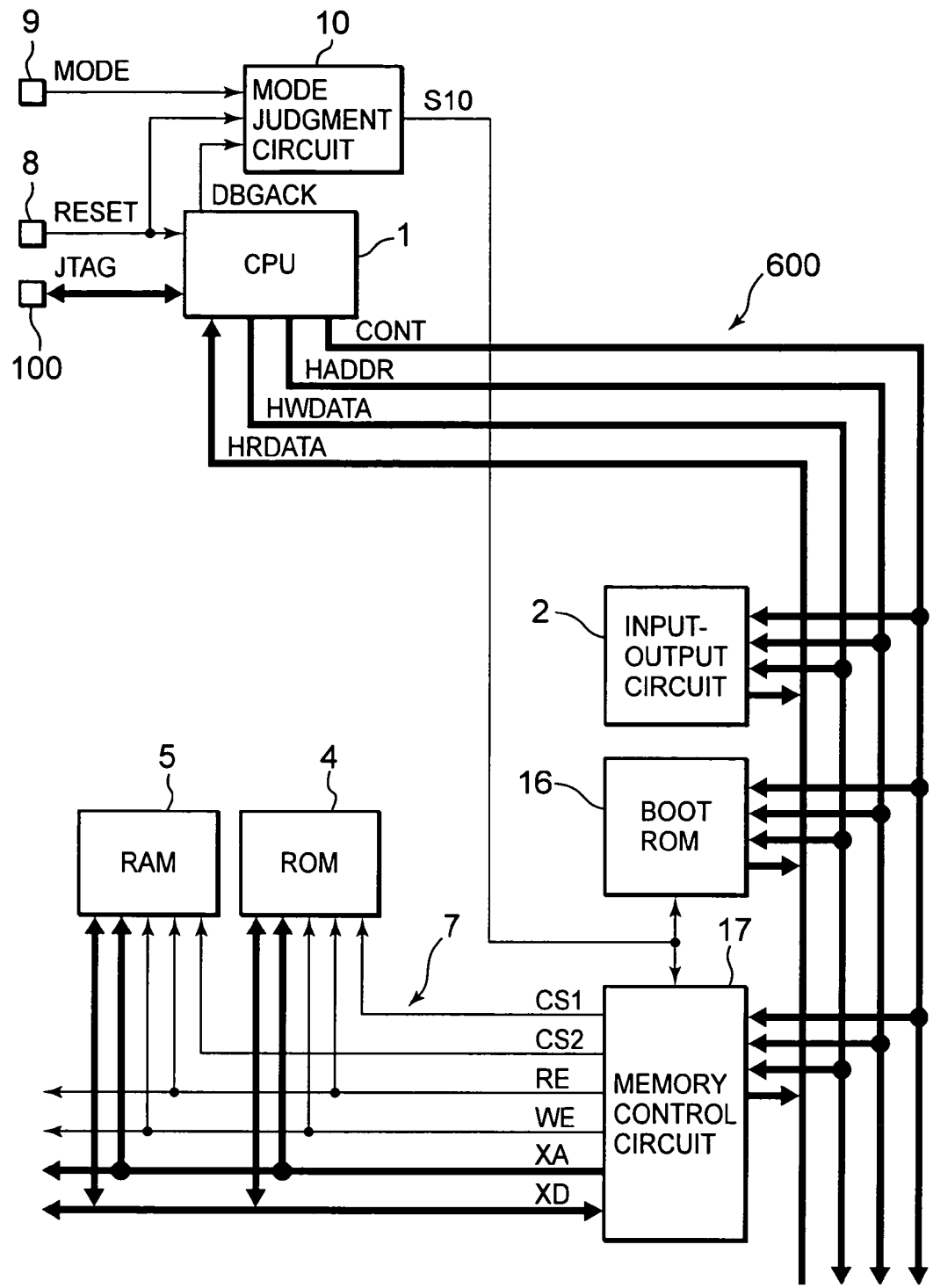
FIG. 10 is a schematic circuit diagram for describing a debugging circuit in a central processing system according to a fourth preferred embodiment of the present invention.

FIG. 10 is a schematic circuit diagram for describing a debugging circuit in a central processing system according to a fourth preferred embodiment of the present invention. The debugging circuit according to the fourth preferred embodiment has the data bus 600 according to the third preferred embodiment and the memory bus 7 according to the first preferred embodiment. Furthermore, the debugging circuit according to the fourth preferred embodiment has a boot ROM 16 and a memory control circuit 17 which are respectively different than those according to the third preferred embodiment. In this example, the boot ROM 16 is a second memory circuit. The other configurations of the debugging circuit according to the fourth preferred embodiment are the same as those according to the third preferred embodiment. The mode signal input terminal 9, the mode judgment circuit 10 and the boot ROM 16 constitute a debugging preparation circuit which operates in accordance with the JTAG interface.

The boot ROM 16 is coupled to the CPU 1 through the data bus 600 as well as the input-output circuit 2. The boot ROM 16 stores a second instruction code which corresponds to a second program. The second program is different than the first program and is executed by the CPU 1 during the debugging preparation. That is, the CPU 1 executes the self-looped operation in accordance with the second program, from the cancellation of the reset of the CPU 1 till the completion of the debugging preparation. The boot ROM 16 is also coupled to the mode judgment circuit 10 so as to be controlled by the mode judgment signal S10. The boot ROM 16 starts when the mode judgment signal S10 is asserted. Meanwhile, the boot ROM 16 comes to a standstill when the mode judgment signal S10 is negated. When the CPU 1 executes the first program in accordance with the first instruction code stored in the ROM 4 through the memory control circuit 17 or the input-output circuit 2, the boot ROM 16 responds to the request motion from the CPU 1 instead of the ROM 4. The memory control circuit 17 is coupled to the CPU 1 through the data bus 600 and coupled to the ROM 4 and the RAM 5 through the memory bus 7. The memory control circuit 17 starts when the mode judgment signal S10 is negated. Meanwhile, the memory control circuit 17 comes to a standstill when the mode judgment signal S10 is asserted. Either the ROM 16 or the memory control circuit 17 starts in accordance with the mode judgment signal S10.

The operation of the debugging circuit in the central processing system according to the third preferred embodiment of the present invention is described below.

FIGS. 11A through 11F are signal waveform diagrams for describing the operation of the debugging circuit in FIG. 11. FIG. 11A represents a waveform of the debug acknowledge signal DBGACK, FIG. 11B represents a waveform of the reset signal RESET, FIG. 11C represents a waveform of the mode judgment signal S10, FIG. 11D represents a waveform of the data bus control signal DBC, FIG. 11E represents a waveform of a start-up signal of the memory control circuit 17, and FIG. 11F represents a waveform of a start-up signal of the boot ROM 16.

First of all, the mode signal MODE is asserted so that the CPU 1 operates in the debugging mode, when the reset signal RESET has been asserted so that the CPU 1 is kept reset. At this time, the mode judgment signal S10 is kept negated in accordance with the reset signal RESET, and the debug acknowledge signal DBGACK is kept negated to indicate the control register 106 of the CPU 1 has not received the debug data. While the mode judgment signal S10 is negated, the boot ROM 16 comes to a standstill and the memory control circuit 17 starts. However, since the CPU 1 has been reset in this term, the CPU 1 does not receive the first instruction code stored in the ROM 4 through the memory control circuit 17.

Then, the reset signal RESET is negated to cancel the reset of the CPU 1 while the mode signal MODE is kept asserted and the debug acknowledge signal DBGACK is kept negated, as shown in FIGS. 11A and 11B. Thus, the mode judgment signal S10 is asserted to indicate that the CPU 1 is preparing to debug the first program as shown in FIG. 11C. After the reset signal RESET is negated, that is, after the reset of the CPU 1 is canceled, the mode judgment signal S10 has been asserted in accordance with the negated debug acknowledge signal DBGACK and the asserted reset signal RESET in order to indicate that the CPU 1 is preparing to debug. In accordance with the asserted mode judgment signal S10, the boot ROM 16 starts and the memory control circuit 17 comes to a standstill during the debugging preparation.

Meanwhile, the CPU 1 may attempt to execute the first program in accordance with the first instruction code stored in the ROM 4, from the cancellation of the reset of the CPU 1 till the completion of the debugging preparation. When the CPU 1 attempts to execute the first program, the data bus control signal DBC is asserted as shown in FIG. 11D. At this time, since the boot ROM 16 has started and the memory control circuit 17 has come to a standstill, the CPU 1 accesses the boot ROM 16 in order to execute the second program. That is, the CPU 1 receives the second instruction code from the boot ROM 16 during the debugging preparation. As a result, the CPU 1 executes the self-looped operation or stands by for executing the first program and is prevented from executing the first program during the debugging preparation.

Thereafter, the control register 106 of the CPU 1 receives the debug data which are serially transferred from the JTAG interface and then the debugging preparation is completed. At this time, the debug acknowledge signal DBGACK is asserted with the mode signal MODE asserted and with the reset signal RESET negated, in order to indicate that the control register 106 has already received the debug data, as shown in FIG. 11A. Then, the mode judgment signal S10 is negated to indicate that the debugging preparation is completed in accordance with the asserted debug acknowledge signal DBGACK as shown in FIG. 11C. In accordance with the negated mode judgment signal S10, the boot ROM 16 comes to a standstill and the memory control circuit 17 starts during the debugging preparation. At this time, if the CPU 1 attempts to execute the first program, the first instruction code stored in the ROM 4 are transferred to the CPU 1 through the memory data bus XD, the memory control circuit 17 and the reading data bus HRDATA. That is, the first program can be properly debugged by the debug data input to the control register 106 of the CPU 1 in the debugging operation mode.

Also, when the SRAM is used instead of the ROM 4 for debugging during a program development, a first program to be executed by the CPU 1 is transferred from the JTAG interface to the SRAM through the control register 106 of the CPU 1 after the completion of the debugging preparation. Even in this case, according to the first preferred embodiment, the CPU 1 is prevented from executing the indeterminate first program stored in the SRAM from the cancellation of the reset of the CPU 1 till the completion of the debugging preparation. In addition, when the mode signal MODE is negated so that the debugging circuit operates in the normal operational mode, the mode judgment circuit 10 does not assert the mode judgment signal S10 regardless of the cancellation of the reset of the CPU 1. Therefore, the boot ROM 16 comes to a standstill and the memory control circuit 17 starts in the normal operational mode. As a result, the CPU 1 can properly access the ROM 4 as soon as the cancellation of the reset of the CPU 1.

According to the fourth preferred embodiment, the debugging circuit includes the mode judgment circuit which judges whether the control register of the CPU has received the debug data after the cancellation of the reset of the CPU and which couples the CPU to the second memory circuit instead of the first memory circuit during the debugging preparation. The CPU receives the second instruction code stored in the second memory circuit and then executes the self-looped operation or stands by for executing the first program during the debugging preparation. Therefore, the debugging operation of the CPU can be properly executed after the cancellation of the reset of the CPU. Furthermore, since either the boot ROM or the memory control circuit starts, adverse influences on load characteristics of the data bus may be kept low.

What is claimed is:

1. A debugging circuit, comprising:
   a central processing unit that executes a predetermined program and generates a control signal when executing the predetermined program;
   a control register, included in the central processing unit, that receives debug data that is used to debug the predetermined program;
   a mode judgment circuit, coupled to the central processing unit, that generates a mode judgment signal when a reset of the central processing unit has been canceled and the control register has not received the debug data, wherein the mode judgment signal indicates that the central processing unit is preparing to debug the predetermined program;

a monitoring circuit, coupled to the central processing unit and the mode judgment circuit, that generates a monitoring signal based on the control signal and the mode judgment signal, wherein the monitoring signal is indicative of an attempt by the central processing unit to execute the predetermined program during the debugging preparation;

a selection circuit, coupled to the monitoring circuit and the central processing unit, that prevents the central processing unit from executing the predetermined program during the debugging preparation, responsive to the monitoring signal;

a memory circuit that stores an instruction code which corresponds to the predetermined program;

an input-output circuit that receives an external instruction code; and a data bus coupled to the selection circuit, the memory circuit and the input-output circuit, wherein one of the instruction code and the external instruction code is transferred along the data bus, responsive to the control signal, wherein the data bus includes a data bus control signal line along which the control signal is transferred, and wherein the control signal controls the transferring of the one of the instruction code and the external instruction code along the data bus, and wherein the selection circuit is coupled to the data bus control signal line to receive the control signal and turns the data bus control signal line to an idle state so that the central processing unit is prevented from executing the predetermined program during the debugging preparation.

2. The debugging circuit according to claim 1, wherein the data bus includes a read data bus coupled to the input-output circuit and the memory circuit, so that the one of the instruction code and the external instruction code is transferred to the central processing unit.

3. The debugging circuit according to claim 2, wherein the selection circuit is coupled to the read data bus so that the one of the instruction code and the external instruction code is transferred to the central processing unit through the read data bus during a normal operation of the central processing unit.

4. The debugging circuit according to claim 1, wherein the selection circuit generates a command signal for the central processing unit responsive to the monitoring signal, wherein the command signal prevents the central processing unit from executing the predetermined program during the debugging preparation.

5. The debugging circuit according to claim 1, wherein the selection circuit is an OR gate which turns the data bus control signal line to the idle state responsive to the monitoring signal and the control signal.

6. The debugging circuit according to claim 1, further comprising:

test access ports, corresponding to an interface of the Joint Test Action Group, that are coupled to the central processing unit and receive the debug data, and that transfer the debug data to the control register after the reset of the central processing unit has been canceled.

7. A debugging circuit, comprising:

a central processing unit that executes a first program during a normal operational mode of the central processing unit;

a control register, included in the central processing unit, that receives debug data by which the first program is to be debugged;

a mode judgment circuit, coupled to the central processing unit, that generates a mode judgment signal when a reset of the central processing unit has been canceled and the control register has not received the debug data, wherein the mode judgment signal indicates that the central processing unit is preparing to debug the first program;

a first memory circuit which is to be coupled to the central processing unit, that stores a first instruction code which corresponds to the first program;

a second memory circuit which is to be coupled to the central processing unit, that stores a second instruction code which corresponds to a second program, wherein the central processing unit is prevented from executing the first program by the second program during the debugging preparation; and a selection circuit coupled between the central processing unit and the first and second memory circuits through which the central processing unit accesses either the first memory circuit or the second memory circuit, wherein the central processing unit executes the second program instead of the first program, responsive to switching of the selection circuit controlled by the mode judgment signal during the debugging preparation.

8. The debugging circuit according to claim 7, further comprising:

a memory control circuit, coupled between the selection circuit and the central processing unit, wherein the first and second memory circuits are accessed by the central processing unit through the memory control circuit.

9. The debugging circuit according to claim 7, further comprising:

a memory control circuit coupled between the central processing unit and the first memory circuit, wherein the memory control circuit prevents the central processing unit from accessing the first memory circuit to execute the first program responsive to the mode judgment signal during the debugging preparation.

10. The debugging circuit according to claim 7, wherein the second memory circuit is accessed by the central processing unit responsive to the mode judgment signal during the debugging preparation.

11. The debugging circuit according to claim 7, further comprising:

test access ports, corresponding to an interface of the Joint Test Action Group, that are coupled to the central processing unit and receive the debug data, and that transfer the debug data to the control register after a reset of the central processing unit has been canceled.

12. A method of controlling a debugging circuit which debugs a predetermined program using debug data input to a control register of a central Processing unit, the method comprising:

generating a mode judgment signal when a reset of the central processing unit has been canceled and the control register has not received the debug data, wherein the mode judgment signal indicates that the central processing unit is preparing to debug the predetermined program;

generating a control signal during execution of the predetermined program from the control register;

generating a monitoring signal responsive to the control signal and the mode judgment signal, wherein the monitoring signal is indicative of an attempt by the central processing unit to execute the predetermined program during the debugging preparation; and controlling a data bus along which an instruction code corresponding to the predetermined program is transferred, so that the central processing unit is prevented from executing the predetermined program during the debugging preparation, responsive to the monitoring signal, wherein said controlling a data bus comprises generating a command signal responsive to the monitoring signal, wherein the command signal prevents the central processing unit from transferring address data corresponding to the predetermined program to another circuit.

13. The method according to claim 12, wherein said controlling a data bus comprises:

generating a command signal responsive to the monitoring signal, wherein the command signal prevents the central processing unit from receiving the instruction code corresponding to the predetermined program.

14. The method according to claim 12, wherein the debug data is input to the control register through test access ports which correspond to an interface of the Joint Test Action Group.

15. A method of controlling a debugging circuit which debugs a first program using debug data input to a control register of a central processing unit, the first program being executed by the central processing unit during a normal operational mode, the method comprising:

generating a mode judgment signal when a reset of the central processing unit has been canceled and the control register has not received the debug data, wherein the mode judgment signal is indicative that the central processing unit is preparing to debug the first program;

controlling a data bus so that the central processing unit is prevented from accessing a first instruction code corresponding to the first program during the debugging preparation, responsive to the mode judgment signal; and transferring a second instruction code corresponding to a second program different than the first program, to the central processing unit through the data bus during the debugging preparation, responsive to the mode judgment signal, wherein said controlling a data bus comprises preventing the central processing unit from accessing a first memory circuit in which the first instruction code is stored responsive to the mode judgment signal, and allowing the central processing unit to access a second memory circuit in which the second instruction code is stored.

16. The preparing method according to claim 15, wherein said controlling a data bus is executed by a selection circuit which is coupled between the central processing unit and the first memory circuit, responsive to the mode judgment signal.

17. The method according to claim 15, wherein the debug data is input to the control register through test access ports which correspond to an interface of the Joint Test Action Group.

* * * * *